(12) United States Patent
Ortiz Egea

(10) Patent No.: US 11,651,503 B2
(45) Date of Patent: May 16, 2023

(54) DETERMINING DEPTH IN A DEPTH IMAGE

(71) Applicant: Microsoft Technology Licensing, LLC, Redmond, WA (US)

(72) Inventor: Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 16/903,156

(22) Filed: Jun. 16, 2020

(65) Prior Publication Data

US 2021/0390719 A1 Dec. 16, 2021

(51) Int. Cl.
*G06T 7/521* (2017.01)
*G01S 7/4915* (2020.01)
*G01S 17/894* (2020.01)

(52) U.S. Cl.
CPC ............ *G06T 7/521* (2017.01); *G01S 7/4915* (2013.01); *G01S 17/894* (2020.01); *G06T 2207/10028* (2013.01)

(58) Field of Classification Search
CPC ........... G06T 7/521; G06T 2207/10028; G01S 17/894; G01S 7/4915
See application file for complete search history.

(56) References Cited

U.S. PATENT DOCUMENTS

| | | | |
|---|---|---|---|
| 7,725,288 B2 | 5/2010 | Boillot | |
| 7,791,715 B1 | 9/2010 | Bamji | |
| 8,587,771 B2 | 11/2013 | Xu et al. | |
| 9,117,277 B2* | 8/2015 | Morgan-Mar | G06T 7/571 |
| 9,405,008 B2* | 8/2016 | Raskar | G01S 17/894 |
| 9,488,722 B2 | 11/2016 | Waligorski | |
| 9,702,976 B2 | 7/2017 | Xu et al. | |
| 9,753,128 B2 | 9/2017 | Schweizer et al. | |
| 10,739,447 B2* | 8/2020 | Gutierrez Barragan | G01S 17/894 |
| 10,796,191 B2* | 10/2020 | De Salivet de Fouchecour | G06V 10/507 |
| 11,187,070 B2* | 11/2021 | Stark | H04N 5/2256 |
| 11,263,765 B2* | 3/2022 | Mirbach | G01S 7/491 |
| 11,380,004 B2* | 7/2022 | Xiao | G01S 7/486 |

(Continued)

OTHER PUBLICATIONS

"Non Final Office Action Issued in U.S. Appl. No. 15/941,885", dated Jun. 11, 2020, 8 Pages.

(Continued)

*Primary Examiner* — Gregory M Desire
(74) *Attorney, Agent, or Firm* — Alleman Hall Creasman & Tuttle LLP

(57) ABSTRACT

Examples are disclosed that relate to methods and systems for determining a depth of a pixel of a depth image. In one example, a method comprises illuminating a scene with amplitude-modulated light of a plurality K of different frequencies. A sensor detects the amplitude-modulated light as reflected from the scene. A plurality K of complex signals k is formed by determining, for each frequency k of the plurality of different frequencies K, a complex signal k comprising a real portion k and an imaginary portion k. A comparison function is used to compare the plurality K of complex signals to a corresponding plurality K of modeled signals, each modeled signal k comprising a modeled real portion k and a modeled imaginary portion k. The method further comprises determining the depth of the pixel based at least on the comparison function and outputting the depth of the pixel.

20 Claims, 14 Drawing Sheets

(56) References Cited

U.S. PATENT DOCUMENTS

| | | |
|---|---|---|
| 11,443,447 B2* | 9/2022 | Wang ............... G06T 7/521 |
| 2014/0049767 A1 | 2/2014 | Benedetti et al. |
| 2014/0354775 A1 | 12/2014 | Barsoum et al. |
| 2016/0047913 A1 | 2/2016 | Mirbach et al. |
| 2016/0116594 A1 | 4/2016 | Ku et al. |
| 2017/0323429 A1 | 11/2017 | Godbaz et al. |
| 2018/0011195 A1 | 1/2018 | Perry et al. |
| 2018/0210070 A1 | 7/2018 | Bleyer et al. |
| 2018/0259455 A1 | 9/2018 | Bhandari et al. |
| 2018/0341008 A1 | 11/2018 | Ortiz Egea |
| 2019/0302244 A1 | 10/2019 | Egea |
| 2020/0051218 A1 | 2/2020 | Hyun et al. |

OTHER PUBLICATIONS

Lenzen, et al., "Denoising Strategies for Time-of-Flight Data", In Proceedings of International Conference On Pervasive Computing, Aug. 1, 2013, pp. 25-45.

Li, Larry, "Filtering for 3D Time-of-Flight Sensors", In White Paper of Texas Instruments, SLOA230, Jan. 31, 2016, 9 Pages.

"International Search Report and Written Opinion Issued in PCT Application No. PCT/US20/026048", dated Jul. 6, 2020, 13 Pages.

"International Search Report and Written Opinion Issued in PCT Application No. PCT/US20/036225", dated Sep. 10, 2020, 11 Pages.

"Non Final Office Action Issued in U.S. Appl. No. 16/391,117", dated Apr. 29, 2020, 12 Pages.

* cited by examiner

1400

(B) →

| USE A COMPARISON FUNCTION TO COMPARE THE PLURALITY K OF COMPLEX SIGNALS TO A CORRESPONDING PLURALITY K OF MODELED SIGNALS K, EACH MODELED SIGNAL K COMPRISING A MODELED REAL PORTION K AND A MODELED IMAGINARY PORTION K 1410 |

> FOR EACH FREQUENCY K, SQUARE A REAL DIFFERENCE BETWEEN THE REAL PORTION K AND THE MODELED REAL PORTION K; FOR EACH FREQUENCY K, SQUARE A COMPLEX DIFFERENCE BETWEEN THE IMAGINARY PORTION K AND THE MODELED IMAGINARY PORTION K; ADD THE REAL DIFFERENCE AND THE COMPLEX DIFFERENCE TO FORM A DIFFERENCE OF THE SUMS FOR EACH FREQUENCY K; AND SUM THE DIFFERENCE OF THE SUMS FOR ALL FREQUENCIES K, WHEREIN THE DEPTH OF THE PIXEL CORRESPONDS TO A DISTANCE OF A DETERMINED MINIMUM OF THE COMPARISON FUNCTION 1412

>> THE MODELED REAL PORTION K COMPRISES A COSINE FUNCTION AND THE MODELED COMPLEX PORTION K COMPRISES A SINE FUNCTION 1414

FOR EACH FREQUENCY K, DETERMINE A REAL PRODUCT OF THE REAL PORTION K AND THE MODELED REAL PORTION K; FOR EACH FREQUENCY K, DETERMINE A COMPLEX PRODUCT OF THE IMAGINARY PORTION K AND THE MODELED IMAGINARY PORTION K; ADD THE REAL PRODUCT AND THE COMPLEX PRODUCT TO FORM A SUM OF THE PRODUCTS FOR EACH FREQUENCY K; AND SUM THE SUM OF THE PRODUCTS FOR ALL FREQUENCIES K, WHEREIN THE DEPTH OF THE PIXEL CORRESPONDS TO A DISTANCE OF A DETERMINED MAXIMUM OF THE COMPARISON FUNCTION 1416

REFERENCE A LOOKUP TABLE COMPRISING DISCRETE VALUES OF THE MODELED SIGNAL 1418

> EACH MODELED SIGNAL K COMPRISES A PLURALITY OF DISCRETE POINTS WITH A LINEAR OR POLYNOMIAL INTERPOLATION BETWEEN EACH PAIR OF DISCRETE POINTS 1420

> WHEN A VALUE OF THE COMPLEX SIGNAL K FALLS BETWEEN TWO DISCRETE VALUES OF THE MODELED SIGNAL K, CHOOSE ONE OF THE DISCRETE VALUES BASED AT LEAST ON THE COMPARISON FUNCTION 1422

FOR AT LEAST ONE FREQUENCY K, IDENTIFY TWO POINTS AT WHICH THE COMPLEX SIGNAL K INTERSECTS THE MODELED SIGNAL K WITHIN A PERIOD OF THE MODELED SIGNAL K; AND GENERATE ANY REMAINING INTERSECTION POINTS FOR THE FREQUENCY K WITHIN A RANGE OF AMBIGUITY BY ADDING THE PERIOD OF THE MODELED SIGNAL K TO EACH OF THE TWO POINTS 1424

FOR A FIRST FREQUENCY K, IDENTIFY ONE OR MORE FIRST POINTS AT WHICH THE COMPLEX SIGNAL K INTERSECTS THE MODELED SIGNAL K; AND FOR A SECOND FREQUENCY K, IDENTIFY ONE OR MORE SECOND POINTS AT WHICH THE COMPLEX SIGNAL K INTERSECTS THE MODELED SIGNAL K, WHEREIN THE ONE OR MORE SECOND POINTS ARE WITHIN A THRESHOLD DISTANCE OF THE ONE OR MORE FIRST POINTS 1426

DETERMINING DEPTH IN A DEPTH IMAGE

BACKGROUND

Depth sensing systems, such as time-of-flight (ToF) imaging systems, may be used to produce a depth image of an environment, with each pixel of the depth image representing a distance to a corresponding point in the environment. A distance to a point on an imaged surface in the environment is determined based on a time interval for light emitted by the imaging system to travel to that point and return to a sensor of the imaging system. An optical ToF imaging system measures this interval for many points on the surface and thereby assembles a depth image in which a depth coordinate for each pixel in the depth image is proportional to a ToF observed at that pixel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to determining a depth of a pixel of a depth image. In one example, a method for determining a depth of a pixel of a depth image comprises illuminating a scene with amplitude-modulated light of a plurality K of different frequencies. A sensor detects the amplitude-modulated light as reflected from the scene. A plurality K of complex signals k is formed by determining, for each frequency k of the plurality of different frequencies K, a complex signal k comprising a real portion k and an imaginary portion k. A comparison function is used to compare the plurality K of complex signals to a corresponding plurality K of modeled signals, each modeled signal k comprising a modeled real portion k and a modeled imaginary portion k. The method further comprises determining the depth of the pixel based at least on the comparison function and outputting the depth of the pixel.

BRIEF DESCRIPTION OF THE DRAWINGS

FIGS. 14A-14C show a block diagram of an example method for determining a depth of a pixel in a depth image.

DETAILED DESCRIPTION

Depth sensing systems, such as time-of-flight (ToF) imaging systems, may be used to produce a depth image of an environment, with each pixel of the depth image representing a distance to a corresponding point in the environment. In an optical ToF imaging system, a distance to a point on an imaged surface in the environment is determined based on a length of a time interval in which light emitted by the imaging system travels out to that point and then returns back to a sensor of the imaging system, such as an optical sensor array. The imaging system measures this ToF interval for many points on the surface and thereby assembles a depth image in which a depth coordinate for each pixel in the depth image is proportional to a ToF observed at that pixel.

In phase based optical ToF imaging systems, the depth coordinate for each pixel is computed based on a phase lag of modulated light reflected by the imaged surface. For example, an imaging system may be configured to illuminate a scene with amplitude-modulated light of three different frequencies. The imaging system may then detect an amplitude or intensity of the light in one or more samples at each frequency as reflected off an object in the scene, which may be used to reconstruct a phase shift of the light reflected.

In some examples, the phase shift may be calculated using an arctangent or another transcendental function. However, such functions may need to be implemented by a system on a chip (SoC) and/or using a fast algorithm to calculate the phase of the light. In addition, uncertainty scales more rapidly using transcendental functions relative to quadratic functions, which can adversely affect accuracy of distances calculated using transcendental functions compared to quadratic functions.

Accordingly, examples are disclosed herein that relate to methods and systems for determining a depth of a pixel in a depth image based at least on using a comparison function to compare a modeled signal emitted by a light source to a complex signal determined based on an output of a sensor. In this manner, the depth of the pixel may be determined more rapidly, more accurately, and without demanding more specialized computational resources (e.g. an SoC) compared to other methods described above. Furthermore, such methods may be used simultaneously for a manifold of frequencies.

Figure 1:
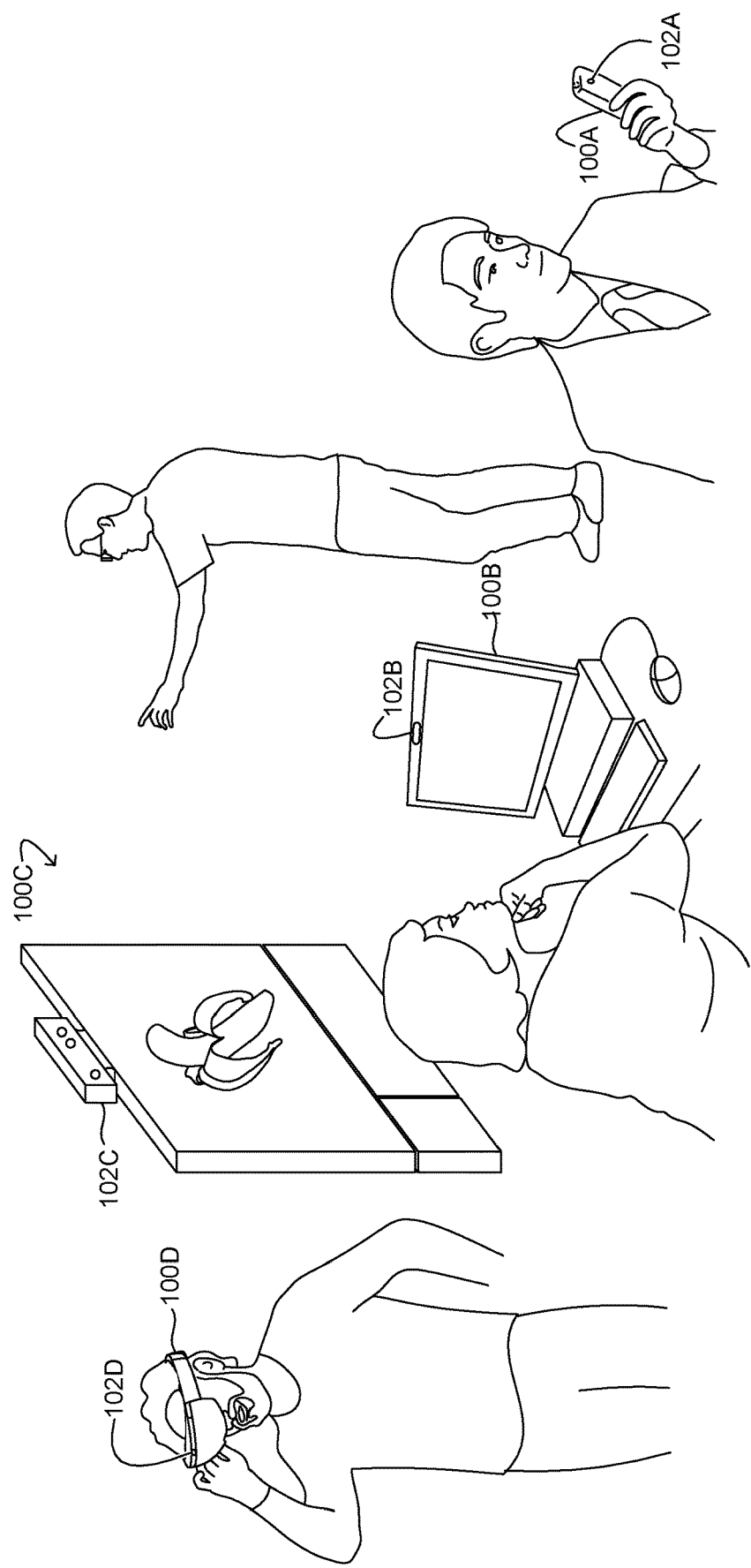
FIG. 1 shows aspects of example electronic devices having embedded or peripheral digital cameras.

In some examples, the methods disclosed herein may be enacted on an electronic device, such as a laptop computing device, a server computing device, a mobile computing device (e.g. a smartphone), or a head-mounted display (HMD) device. FIG. 1 illustrates four different examples of electronic devices 100A-D that may employ phase based optical ToF imaging. The electronic devices 100A-D have embedded or peripheral digital cameras 102A-D, which may be utilized to obtain a depth image as described in more detail below with reference to FIG. 2. Device 100A is a smartphone that includes a camera 102A. Device 100B is a personal computer that includes a web camera 102B. Device 100C is a video game system that includes a peripheral 3D camera 102C. Device 100D is a virtual-reality headset that includes a 3D camera 102D. Devices 100A-D may employ phase based optical ToF imaging in industrial and/or consumer applications, including device automation applications, gaming and virtual reality applications, and biometric and facial recognition applications. It will also be appreciated that any other suitable electronic device may be used, with any other suitable types of user-facing and/or world-facing digital cameras or other suitable optical sensors, in these and other contexts. Aspects of an example depth sensing system are provided below with reference to FIG. 2.

Figure 2:
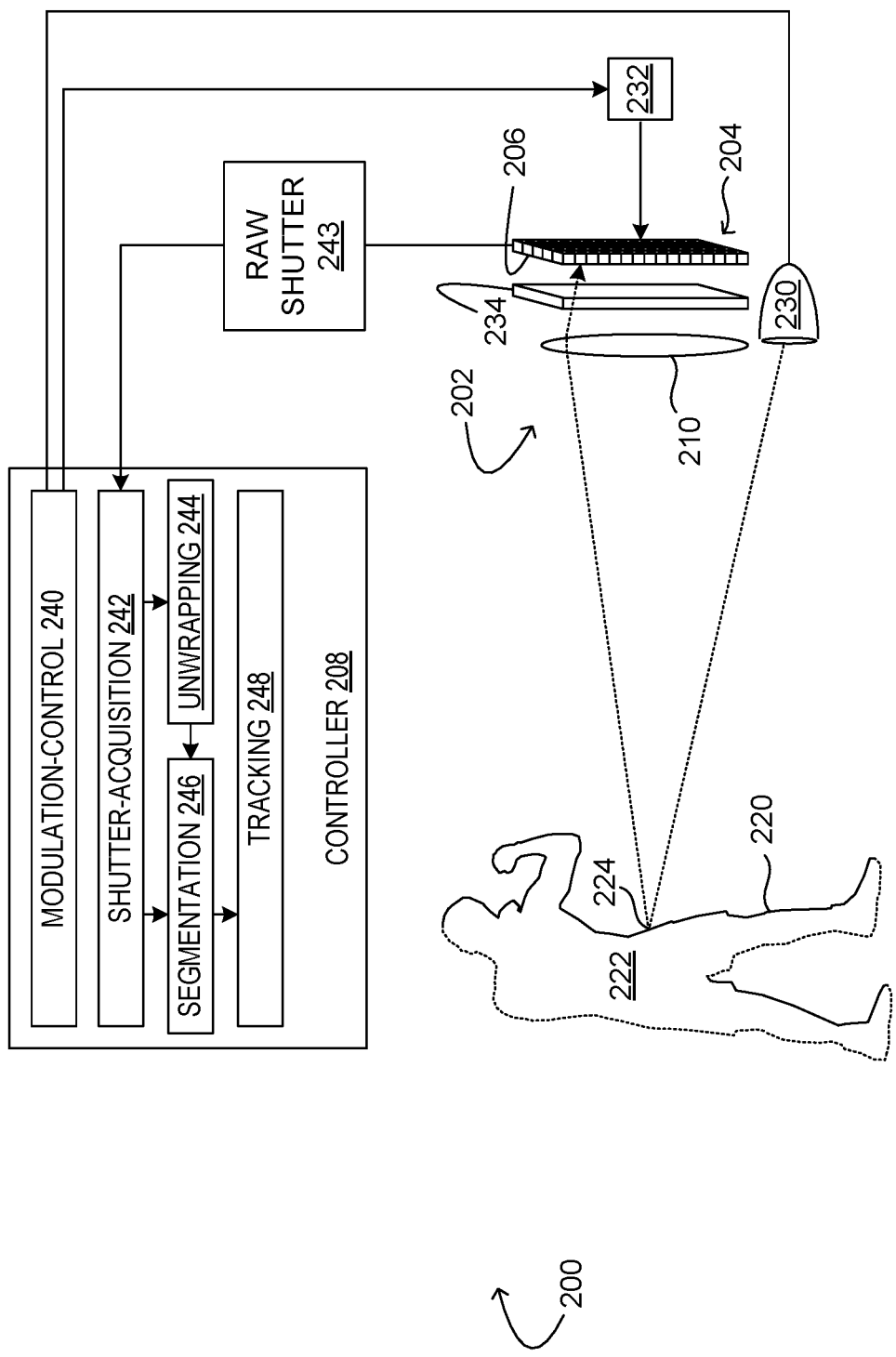
FIG. 2 shows aspects of an example depth sensing system.

FIG. 2 shows one example of a depth sensing system 200. The depth sensing system 200 includes a digital camera 202. The digital camera 202 includes a sensor array 204 comprising plural sensor elements 206 (e.g., pixels), a controller 208, and an objective lens system 210. The objective lens system 210 is configured to focus an image of at least one surface 220 of a photographic subject 222 onto the sensor array 204. The controller 208 is configured to gather and process data from the sensor elements 206 of the sensor array 204 and thereby construct a digital image of the subject. It will be appreciated that the controller 208 may be implemented across one or more computing devices, aspects of which are described in more detail below with reference to FIG. 16.

Digital images constructed by controller 208 may be represented as a numeric array with a signal value $S_j$ provided for each of a set of pixels $(X, Y)_j$. The X, Y position of each pixel of the digital image is mapped to an associated sensor element 206 of sensor array 204, and, via objective lens system 210, to a corresponding associated locus 224 of surface 220. In some implementations, the mapping of image pixels to sensor elements may be a 1:1 mapping, but other mappings may be used as well, such as 1:4, 4:1, among others. In some implementations, digital camera 202 may be configured to acquire a time-resolved sequence of digital images of subject 222—i.e., video.

$S_j$ may comprise a complex value $S_k^i$ in the form of $a+b\sqrt{-1}$, where a and b are integers or real numbers. As described in greater detail below, a complex value $S_k^i$ may be used to represent the signal response of the sensor elements of an optical ToF system that employs continuous-wave (CW) modulation and phase discrimination to resolve radial distance. Such a camera is referred to herein as a 'CW-ToF camera'.

Digital camera 202 of FIG. 2 is an example of a CW-ToF camera configured to resolve radial distance Z to a plurality of points j on surface 220 of photographic subject 222. To enact phase-based ToF imaging, CW-ToF camera 202 includes a modulated light emitter 230 and a sensor array 204 with an analog and/or digitally modulated electronic shutter 232. The modulated light emitter 230 may be configured to emit electromagnetic radiation having any frequency detectable by sensor elements 206. For example, the modulated light emitter 230 may include an infrared (IR) light-emitting diode (LED), laser diode (LD), or any other suitable light source.

The sensor array 204 is configured to image light from the modulated light emitter 230 as reflected off the surface 220 and back to the camera. In some examples, the sensor array 204 comprises a high-resolution array of complementary metal-oxide semiconductor (CMOS) sensor elements 206 or any other suitable sensor(s). As illustrated by example in FIG. 2, the CW-ToF camera 202 includes an objective lens system 210 and a wavelength filter 234 that may be an off-sensor optical component or positioned on a filter layer directly on the sensor array 204. Other optical ToF systems may include different optical, light-emitter and/or sensor-array variants—e.g., a charge-coupled device (CCD) sensor array or a microlens objective array.

The electronic shutter 232 may refer to a controlled voltage signal, including any suitable modulation waveform, with a regulatory bias optionally applied concurrently to certain electrode structures of the various sensor elements 206 of sensor array 204. In some examples, the electrode structures receiving the controlled voltage signal with a bias may include current collectors that, depending on the level of the biased voltage signal, cause photoelectrons created within sensor elements 206 to drift to the current collectors and be measured as current or as voltage via a current to voltage convertor. In some examples, the electrode structures receiving the controlled biased voltage signal may include gates that, depending on the level of the biased voltage signal, encourage the photoelectrons to drift towards the current collectors or current to voltage convertors.

The controller 208 of the CW-ToF camera 202 includes a modulation-control engine 240 configured to modulate light emitter 230 and synchronously modulate electronic shutter 232 of sensor array 204. In some examples, light emitter 230 and electronic shutter 232 are modulated at one or more predetermined frequencies, with a predetermined, angular phase offset p' controlling the retardance of the electronic-shutter modulation relative to the light-emitter modulation.

In some implementations, sensor array 204 images a component of the reflected light that lags emitter modulation by each of a series of predetermined phase offsets p'. Shutter-acquisition engine 242 of controller 208 is configured to interrogate sensor array 204 to retrieve a resulting signal value $S_j$ from each sensor element 206. One digital image captured in this manner is called a 'raw shutter.' A raw shutter 243 may be represented as a numeric array with a φ'-specific intensity value $S_j$ provided for each sensor element 206 and associated with coordinates $(X, Y)_j$ that specify the position of that particular sensor element 206 in sensor array 204. By capturing three or more consecutive raw shutters 243 with three or more different phase offsets φ', it is possible to construct a 'phase image' that reveals the actual phase lag φ of the light reflected back to each sensor element 206. A phase image is a numeric array with $φ_j$ specified for each sensor element j and associated with coordinates $(X, Y)_j$ that specify the position of that particular sensor element 206 in sensor array 204.

Using data from a single phase image or set of component raw shutters, it is possible to conditionally estimate the radial distance $Z_j$ between the depth camera and the surface point imaged at each sensor element j. More particularly, it is possible to solve for the depth using $$(\mu/4\pi)+(N/2)=(Z_j f/c), \qquad \text{(Eq. 2)},$$

where c is the velocity of light, f is the modulation frequency, and N is a non-negative integer.

The solution above is unique when the entire range of depth values $Z_1$ is no larger than half of the distance traveled by light in one modulation period, $c/(2f)$, in which case N is a constant. Otherwise, the solution is underdetermined and periodic. In particular, surface points at depths that differ by any integer multiple of c/(2f) are observed at the same phase lag p. Depth-image data resolved only to that degree—e.g., data from a single phase image or corresponding triad of raw shutters—is said to be 'aliased' or 'wrapped'.

In order to resolve depth in ranges larger than c/(2f), it is possible to compute additional phase images using raw shutters acquired at different modulation frequencies. In some examples three, four, five, or more frequencies may be used; in other examples two frequencies may be used. The combined input from all of the raw shutters (e.g., nine in the case of three frequencies, six in the case of two) is sufficient to uniquely determine each $Z_j$. Redundant depth-imaging of the same subject and image frame to provide a non-periodic depth estimate is called 'de-aliasing' or 'unwrapping'; this function is enacted in unwrapping engine 244 of controller 208. An unwrapped depth image, or 'radial-distance map' may be represented as a numeric array with a radial distance value $Z_1$ provided for each pixel and associated with coordinates $(X, Y)_j$ that specify the pixel position. As an example, modulation-control engine 240 may simultaneously output a modulation signal to a phase shifter. The phase shift steps (>=3) may be set at equal distances within one period (e.g. $2\pi$) for each modulation frequency $f_m$. The phase shifting rf-signal may then be used to demodulate the signal at each pixel.

Using a single higher radio frequency may increase depth resolution but does so with limited non-ambiguity (e.g., 0.75 m at 200 MHz). As such, multiple higher radio frequencies are usually applied to extend the measurement distance following a phase unwrapping technique. Multiple depth maps of the same environment may be captured using different modulation frequencies of emitted light, improving accuracy for environments with varying reflectivity and/or partially occluded objects.

As introduced above, depth imaging data may be unwrapped and used to determine a depth of a pixel in a depth image in several ways, including using an arctangent or another transcendental function. However, s described in more detail below, such data may be unwrapped more rapidly, more accurately, and without demanding more specialized computational resources (e.g. an SoC) by using a comparison function to compare a modeled signal emitted by a light source to a complex signal based on an output of a sensor.

An experimental value for the complex signal value is determined based on the output of the sensor. For example, a computing device may obtain information such as an intensity S and a frequency f of reflected light based on an output of the sensor array 204 of FIG. 2. In some examples, the complex signal takes the form of equation 3, in which a cosine function represents a real portion of the complex signal, a sine function represents an imaginary portion of the complex signal. In equation 3, A represents amplitude and $\varphi$ is a function of frequency and depth:

$$\begin{cases} A * \cos\phi \\ A * \sin\phi \end{cases} \quad \text{(Eq. 3)}$$

In some examples, the complex signal may be determined by performing a discrete Fourier transform on the output of the sensor. In other examples, the complex signal may be determined for each frequency $f_k$ of the plurality of different frequencies, in which $k \in \{1, 2, \ldots, K\}$, as described below in equation 4:

$$\begin{cases} \cos\tilde{\phi}_k = \cos\left(\dfrac{4\pi d f_k}{c}\right) \\ \sin\tilde{\phi}_k = \sin\left(\dfrac{4\pi d f_k}{c}\right) \end{cases} \text{with } d \in [0, d_u]. \quad \text{(Eq. 4)}$$

In equation 4, d represents the depth (e.g. in meters), c is the speed of light (e.g. in m/s), and $d_u$ represents an unambiguity distance (e.g. in meters). In some examples, the unambiguity distance $d_u$ may be calculated as the wrapping distance of the greatest common divisor of the frequencies (gcd({f})), as described below in equation 5:

$$d_u = \dfrac{c}{2 gcd(\{f\})}. \quad \text{(Eq. 5)}$$

Figure 3:
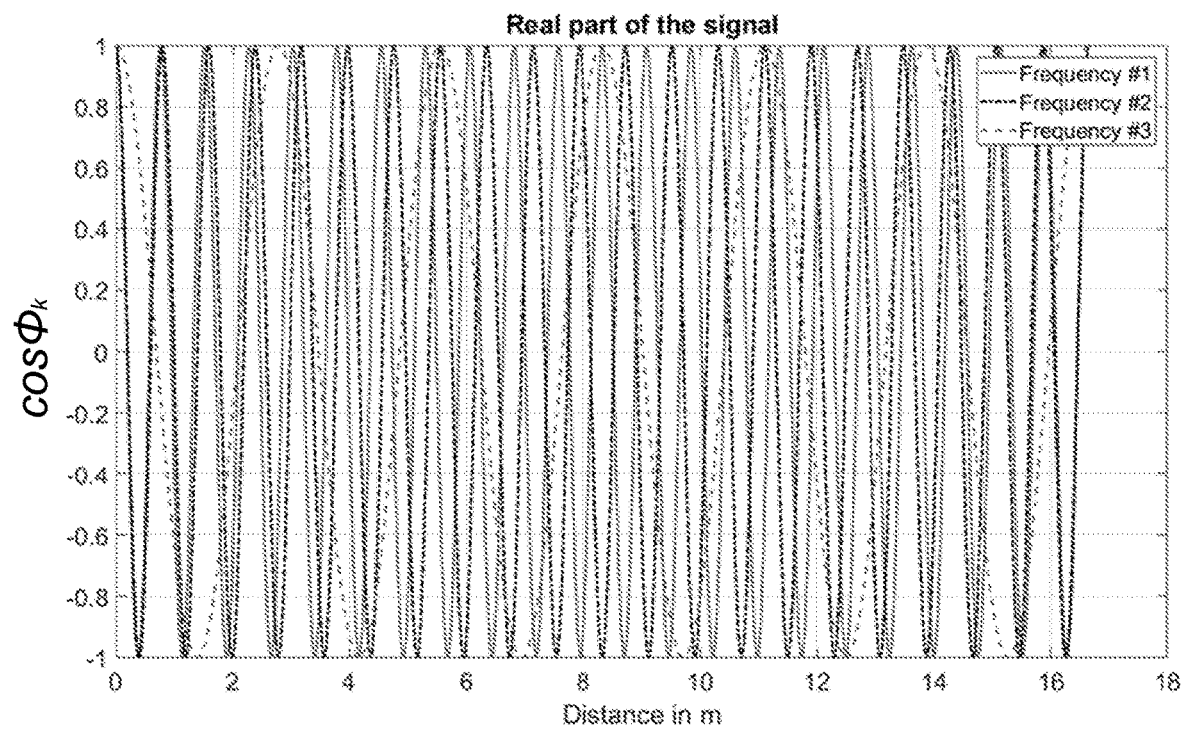
FIG. 3 shows a plot of a real portion of an example complex signal.
Figure 4:
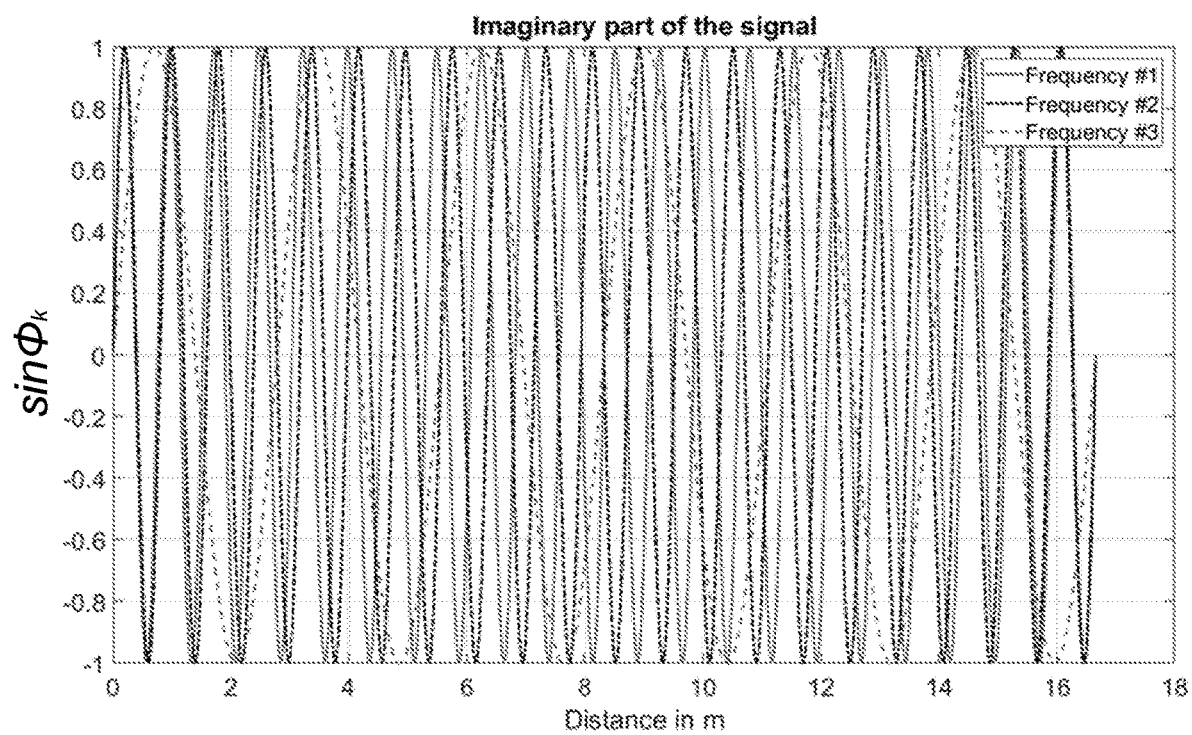
FIG. 4 shows a plot of an imaginary portion of an example complex signal.

FIG. 3 shows a plot of one example of a real portion cos $\tilde{\phi}_k$ of a complex signal, and FIG. 4 shows a plot of one example of an imaginary portion sin $\tilde{\phi}_k$ of the complex signal. In FIGS. 3 and 4, the real portion cos $\tilde{\phi}_k$ and the imaginary portion sin $\tilde{\phi}_k$ are plotted for each of three different illumination light modulation frequencies: "Frequency #1", "Frequency #2", and "Frequency #3". The real portion cos $\tilde{\phi}_k$ and the imaginary portion sin $\tilde{\phi}_k$ are plotted as a function of depth d, as a distance in meters from the imaging system. In the example of FIGS. 3 and 4, $d_u$ is approximately 16.65 m.

To determine experimental values of the real portion cos $\tilde{\phi}_k$ and the imaginary portion sin $\tilde{\phi}_k$, a measured real signal value $\tilde{S}_k^r$ and a measured complex signal value $\tilde{S}_k^i$ may be divided by an active brightness $\widetilde{AB}_k$, as described below in equation 6:

$$\begin{cases} \cos\tilde{\phi}_k = \tilde{S}_k^r / \widetilde{AB}_k \\ \sin\tilde{\phi}_k = \tilde{S}_k^i / \widetilde{AB}_k \end{cases}. \quad \text{(Eq. 6)}$$

The active brightness $\widetilde{AB}_k$ comprises a root sum square of the real signal value $\tilde{S}_k^r$ and the complex signal value $\tilde{S}_k^i$, as described below in equation 7:

$$\widetilde{AB}_k = \sqrt{(\tilde{S}_k^r)^2 + (\tilde{S}_k^i)^2} \quad \text{(Eq. 7).}$$

The experimental values of the real portion cos $\tilde{\phi}_k$, the imaginary portion sin $\tilde{\phi}_k$, the real signal value $\tilde{S}_k^r$, the complex signal value $\tilde{S}_k^i$, and the active brightness $\widetilde{AB}_k$ are denoted by diacritical marks over each variable. The experimental values include detector noise, phase shifts, and other variations from "ideal" light, as it is emitted from the light source.

To determine such variation, and thereby determine depth, the experimental values of each component of the complex signal are compared to a modeled signal. For each frequency k of the plurality of frequencies K, the real portion cos $\tilde{\phi}_k$ and the imaginary portion sin $\tilde{\phi}_k$ of the complex signal are compared to a modeled signal for that frequency k. Each modeled signal comprises a modeled real portion cos $\phi_k$ and a modeled imaginary portion sin $\phi_k$. These modeled variables are distinguished from the experimental values by the absence of diacritical marks.

Figure 5:
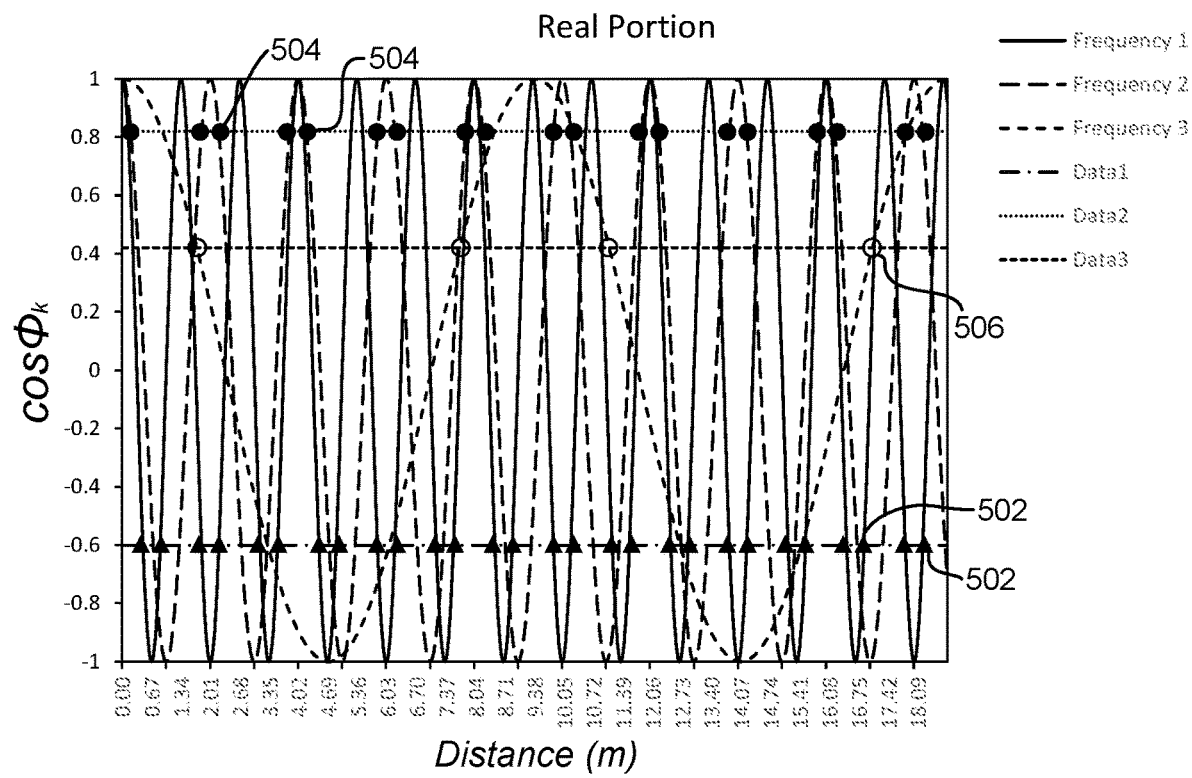
FIG. 5 shows a plot of an example of a real portion of a measured complex signal and a modeled real portion of a modeled signal.

The modeled real portion cos $\phi_k$ and the modeled imaginary portion sin $\phi_k$ may represent an "ideal" or "noiseless" waveform emitted from the light source. FIG. 5 shows a plot of one example of a modeled real portion cos $\phi_k$ of a modeled signal. The modeled real portion cos $\phi_k$ is plotted for each of three different frequencies: cos $\phi_1$ corresponds to "frequency 1", cos $\phi_2$ corresponds to "frequency 2", and cos $\phi_3$ corresponds to "frequency 3".

FIG. 5 also shows a plot of one example of a real portion cos $\tilde{\phi}_k$ of a complex signal. Isolated experimental values of the real portion cos $\tilde{\phi}_k$ of the complex signal were obtained using CW-ToF and plotted for each frequency: "data1" corresponds to cos $\tilde{\phi}_1$ for "frequency 1", "data2" corresponds to cos $\tilde{\phi}_2$ for "frequency 2", and "data3" corresponds to cos $\tilde{\phi}_3$ for "frequency 3". Each value for cos $\tilde{\phi}_k$ is a constant and is plotted as a straight horizontal line that corresponds to a measurement of the complex signal at a pixel, which represents a portion of a surface at a fixed depth in the environment. In the example of FIG. 5, cos $\tilde{\phi}_1$ is approximately –0.6, cos $\tilde{\phi}_2$ is approximately 0.8, and cos $\tilde{\phi}_3$ is approximately 0.4.

Intersections between cos $\tilde{\phi}_k$ and cos $\phi_k$ for each frequency k relate to the distance traveled by the reflected light. In the example of FIG. 5, "frequency 1" (cos $\phi_1$) and "data1" (cos $\tilde{\phi}_1$) intersect at points 502, "frequency 2" (cos $\phi_2$) and "data2" (cos $\tilde{\phi}_2$) intersect at points 504, and "frequency 3" (cos $\phi_3$) and "data3" (cos $\tilde{\phi}_3$) intersect at points 506. It will be appreciated that, while the present example refers to the real portion cos $\tilde{\phi}_k$ of the complex signal and the modeled real portion cos $\phi_k$ of the modeled signal, the same relationships hold for the imaginary portion sin $\tilde{\phi}_k$ of the complex signal and the modeled imaginary portion sin $\phi_k$ of the modeled signal.

How many intersection points occur between the straight lines (experimental complex signal values) with the real portion (cos $\phi_1$) and imaginary portion (sin $\phi_k$) of the model depend on the frequency k. As illustrated by example in FIG. 5, multiple intersections occur for each frequency k. An algorithm may take all these intersections (e.g. the points 502, 504, and 506) and determine which intersections correspond to a correct wrapping, and thereby determine the depth of the pixel. For example, and as described in more detail below, a candidate distance is selected as a determined minimum inter-distance amid the frequencies.

However, the modeled real portion cos $\phi_k$ of the modeled signal and the modeled imaginary portion sin $\phi_k$ of the modeled signal may be highly non-linear, and the intersections difficult to calculate without using transcendental functions (e.g. arctangent). Accordingly, in some examples, the modeled real portion cos $\phi_k$ of the modeled signal and the modeled imaginary portion sin $\phi_k$ of the modeled signal may be discretized.

Figure 6:
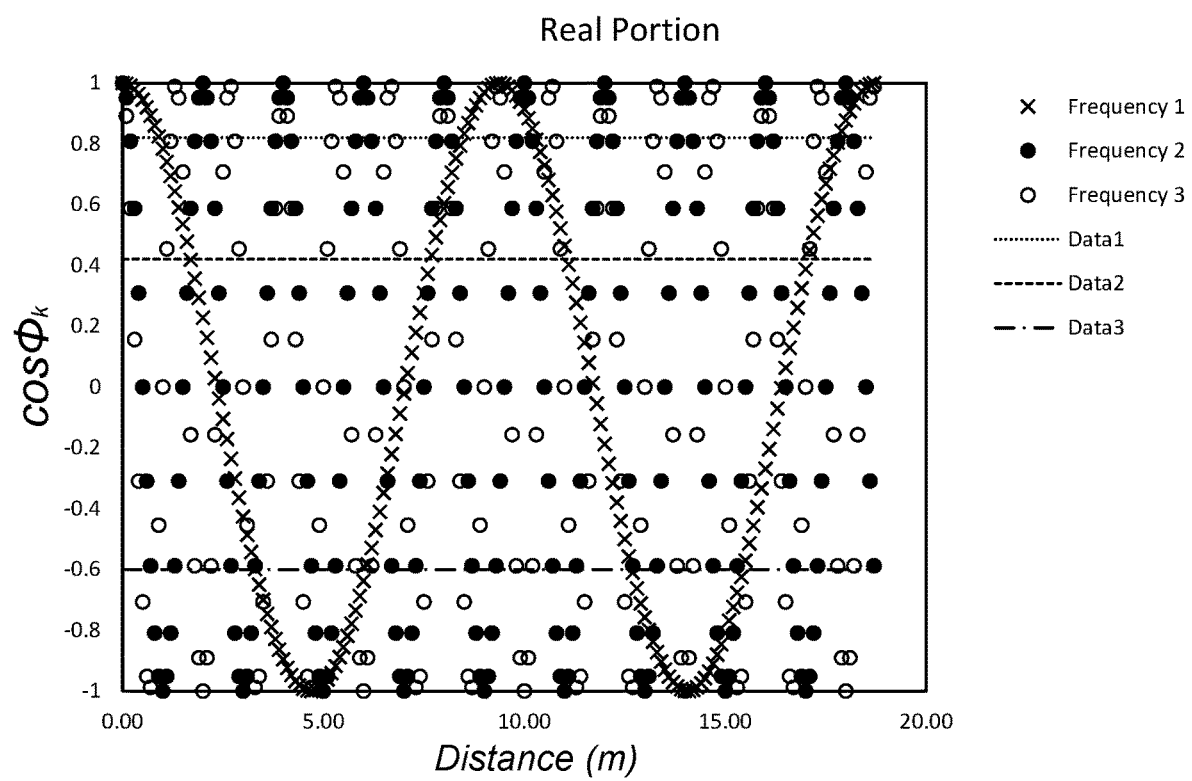
FIG. 6 shows a plot of discrete values of a modeled real portion of a modeled signal.

For example, FIG. 6 shows a plot of discrete values of a modeled real portion cos $\phi_k$ of a modeled signal. In the example of FIG. 6, cos $\phi_k$ is modeled for three different frequencies: cos $\phi_1$ corresponds to "Frequency 1", cos $\phi_2$ corresponds to "Frequency 2", and cos $\phi_3$ corresponds to "Frequency 3". Each of cos $\phi_1$, cos $\phi_2$, and cos $\phi_3$ are modeled and plotted with a precision of 100 mm from d=0 m through $d_u$=18.7 m. FIG. 6 also shows values of the real portion cos $\tilde{\phi}_k$ of the complex signal obtained using CW-ToF for each frequency: "data1" corresponds to cos $\tilde{\phi}_1$ for "frequency 1", "data2" corresponds to cos $\tilde{\phi}_2$ for "frequency 2", and "data3" corresponds to cos $\tilde{\phi}_3$ for "frequency 3".

In various examples, the modeled signal may be discretized at equal distance intervals or at unequal intervals, and may be discretized at any suitable points. Furthermore, the interval between points may be adjusted to achieve a desired accuracy. It will also be appreciated that the modeled real portion cos $\phi_k$ and the modeled imaginary portion sin $\phi_k$ may be discretized in the same manner. In some examples, discrete values of the modeled signal are stored in a lookup table that may be referenced to compare with experimental values of the complex signal and determine depth.

The depth is determined by using a comparison function, such as an error function or a distance function, to compare a plurality of complex signals to a corresponding plurality of modeled signals. In some examples, the depth may be calculated within an unambiguity range as a determined minimum of a quadratic Euclidean distance amid the frequencies k of the plurality K of frequencies, for example as shown below in equation 8:

$$d \to \min\left\{\sum_k^K [\cos\phi_k - \cos\tilde{\phi}_k]^2 + [\sin\phi_k - \sin\tilde{\phi}_k]^2\right\} \quad \text{(Eq. 8)}$$

For each frequency k, a real difference between the real portion cos $\tilde{\phi}_k$ and the modeled real portion cos $\phi_k$ is calculated and squared, and a complex difference between the imaginary portion sin $\phi_k$ and the modeled imaginary portion sin $\phi_k$ is determined and squared. The real difference and the complex difference are added together to form a difference of the sums for each frequency k. The differences of the sums for all frequencies k are added together. In this example, a depth value d for a pixel is the distance at a determined minimum of this expression. It will be appreciated that the determined minimum may be a global minimum, a local minimum, an approximate minimum, or any other suitable value.

Figure 7:
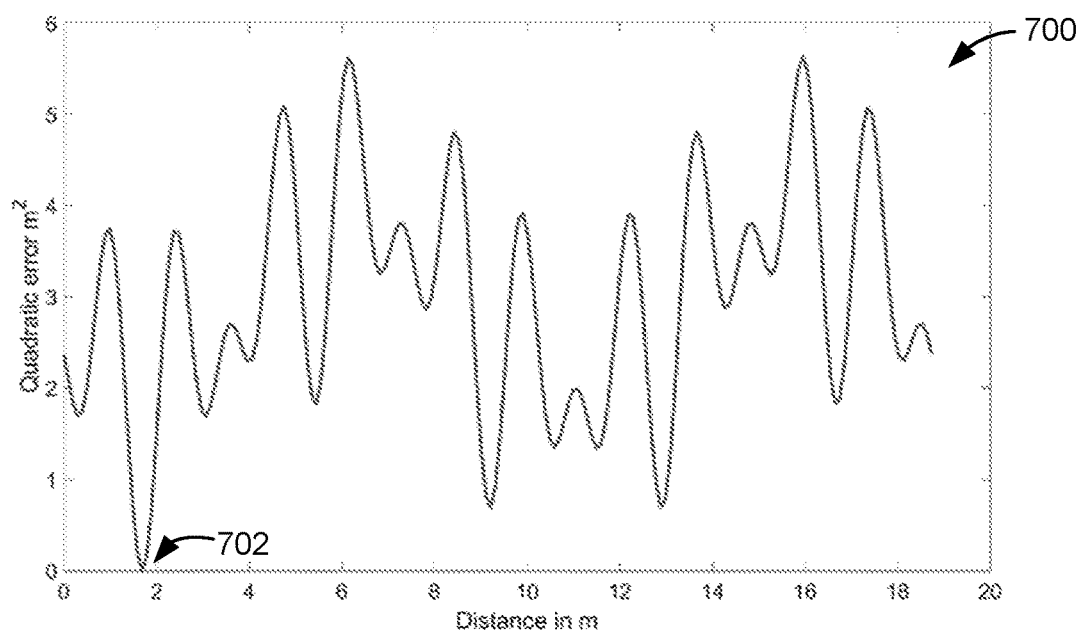
FIG. 7 shows one example of an output of a comparison function.

FIG. 7 shows a plot 700 of one example of an output of a comparison function for the real portion of the complex signal. In the example of FIG. 7, a quadratic Euclidean distance (e.g. quadratic error in m²) is plotted by applying equation 8 to the discrete values of the modeled real portion cos $\phi_k$ of the modeled signal and the real portion cos $\tilde{\phi}_k$ of the complex signal as shown in FIG. 6. As shown in FIG. 7, the comparison function has a global minimum 702 at approximately 1.8 meters.

After some algebraic manipulation, equation 8 may be simplified into equation 9:

$$d \to \max\left\{\sum_k^K \cos\phi_k * \cos\tilde{\phi}_k + \sin\phi_k * \sin\tilde{\phi}_k\right\} \quad \text{(Eq. 9)}$$

In equation 9, a real product of the measured real portion cos $\tilde{\phi}_k$ and the modeled real portion cos $\phi_k$, and a complex product between the measured imaginary portion sin $\tilde{\phi}_k$ and the modeled imaginary portion sin $\phi_k$, are determined for each frequency k. The real product and the complex product are added together to form a sum of the products for each frequency k. The sums of the products for all frequencies k are added together. In the example of equation 9, a depth value d for a pixel is a distance at a determined maximum of this expression, rather than a determined minimum as in equation 8. It will be appreciated that the determined maximum may be a global maximum, a local maximum, an approximate maximum, or any other suitable value.

Figure 8:
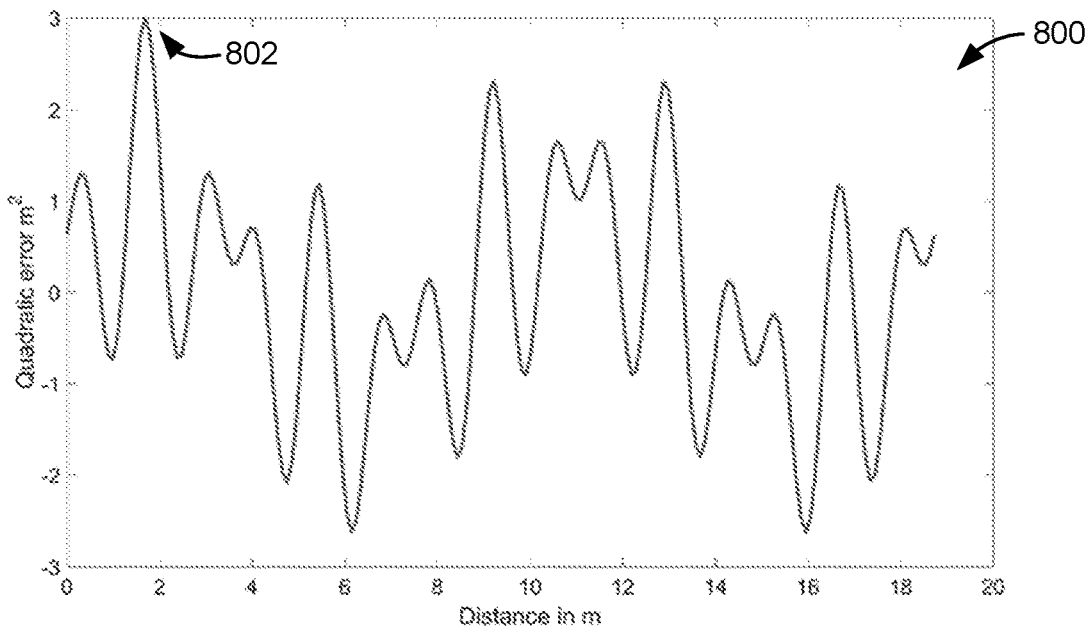
FIG. 8 shows another example of an output of a comparison function.

FIG. 8 shows a plot 800 of one example of an output of a comparison function for the real portion of the complex signal. In the example of FIG. 8, a quadratic Euclidean distance (e.g. quadratic error in m²) is plotted by applying equation 9 to the discrete values of the modeled real portion cos $\phi_k$ of the modeled signal and the real portion cos $\tilde{\phi}_k$ of the complex signal as shown in FIG. 6. The comparison function of FIG. 8 is an inverted form of the comparison function of FIG. 7, with a global maximum 802 at approximately 1.8 meters.

In contrast to the comparison function of equation 8 and FIG. 7, the comparison function of equation 9 provides depth via multiplication operations, which a computing device may perform faster than division operations. In this manner, equation 9 may provide more rapid results and may be easier to implement in hardware than other forms of comparison functions.

In some implementations, the comparison function is configured to evaluate a relatively larger number of points to determine depth values. For example, a lookup table covering an ambiguity distance of 18.7 meters with a precision of 100 mm may include 374 data points for each frequency k: 187 for each cos $\phi_k$ and 187 for each sin $\phi_k$. In other examples, depth calculation may be further simplified by making use of the wrapping property of the modeled signal, and the fact that the experimental values of the complex signal are straight horizontal lines. Accordingly, once two intersection points are calculated for the real and complex components of the signal within one period of the modeled signal (e.g. 2π), any remaining intersection points may be generated by adding the period (e.g. 2π) to each of the two points. This may allow the evaluation of a relatively smaller number of points.

Figure 9:
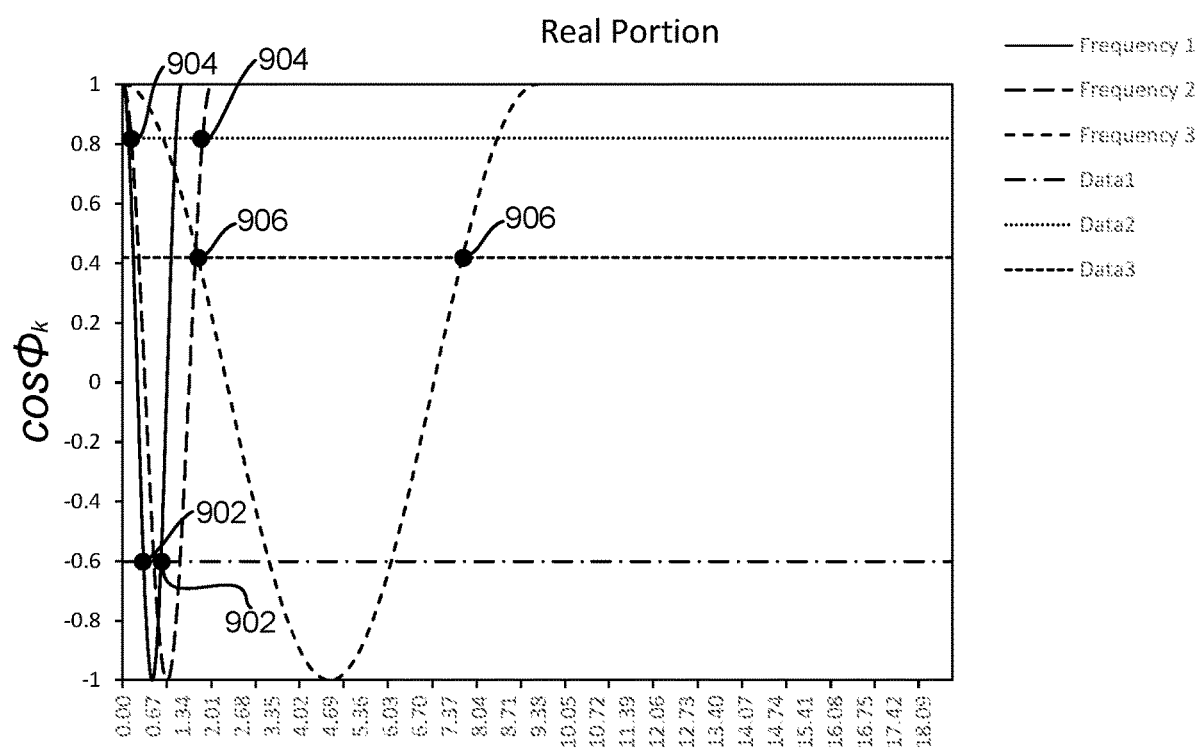
FIG. 9 shows a plot of an example of a real portion of a complex signal and a modeled real portion of a modeled signal within one period of the modeled signal.

FIG. 9 shows a plot of one example a real portion of a complex signal and a modeled real portion of a modeled signal within one period of the modeled signal. In the example of FIG. 9, cos $\phi_k$ is modeled within a nonwrap distance for each of three frequencies: cos $\phi_1$ corresponds to "Frequency 1", cos $\phi_2$ corresponds to "Frequency 2", and cos $\phi_3$ corresponds to "Frequency 3".

The calculation of the non-wrap distance, $d_{nw}$, may be assessed as described below in equation 10:

$$d_{nw} = \frac{c}{2f_k} \quad \text{(Eq. 10)}$$

As illustrated by example in FIG. 9, the non-wrap distance, $d_{nw}$, is approximately 1.33 m for "Frequency 1", approximately 2.0 m for "Frequency 2", and approximately 9.37 m for "Frequency 3." In this manner, the lookup table may be reduced to one wrap per frequency k.

FIG. 9 also shows values of the real portion cos $\tilde{\phi}_k$ of the complex signal obtained using CW-ToF for each frequency: "data1" corresponds to cos $\tilde{\phi}_1$ for "frequency 1", "data2" corresponds to cos $\tilde{\phi}_2$ for "frequency 2", and "data3" corresponds to cos $\tilde{\phi}_3$ for "frequency 3". As illustrated by example in FIG. 9, "data1" intersects "Frequency 1" at two points 902, "data2" intersects "Frequency 2" at two points 904, and "data3" intersects "Frequency 3" at two points 906. Adding the value of the non-wrap distance $d_{nw}$ (e.g. 2π) to each of the two intersection points for each frequency yields two new intersection points, which correspond to the intersection of cos $\tilde{\phi}_k$ and cos $\phi_k$ in a next wrap of the frequency. By repeating this process for each wrap within the unambiguity range (e.g. 0-18.75 m), each intersection may be generated without computing each intersection independently from the lookup table.

In some examples, the number of intersection points independently calculated for each intersection between the complex signal and the modeled signal may be further reduced by applying a comparison function in a similar fashion as equations 8 and 9:

$$\begin{cases} d_k \to \min\{1 - \cos\phi_k * \cos\tilde{\phi}_k + \sin\phi_k * \sin\tilde{\phi}_k\} \\ d_k \to \max\{\cos\phi_k * \cos\tilde{\phi}_k + \sin\phi_k * \sin\tilde{\phi}_k\} \end{cases} \quad \text{(Eq. 11)}$$

Figure 10B:
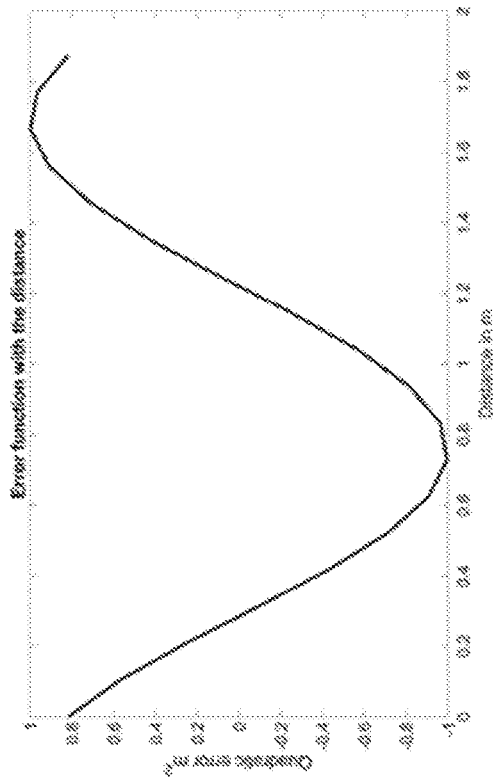
FIGS. 10A-10C show an example of an output of a comparison function for each of three different frequencies of amplitude-modulated light.
Figure 10C:
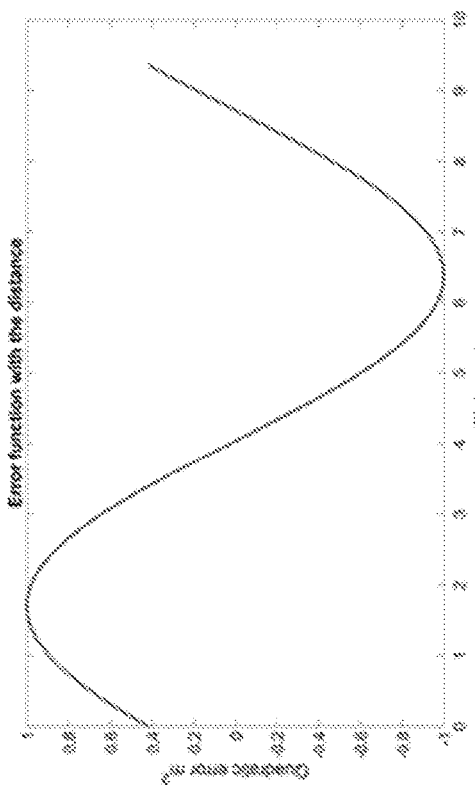
Figure 10A:
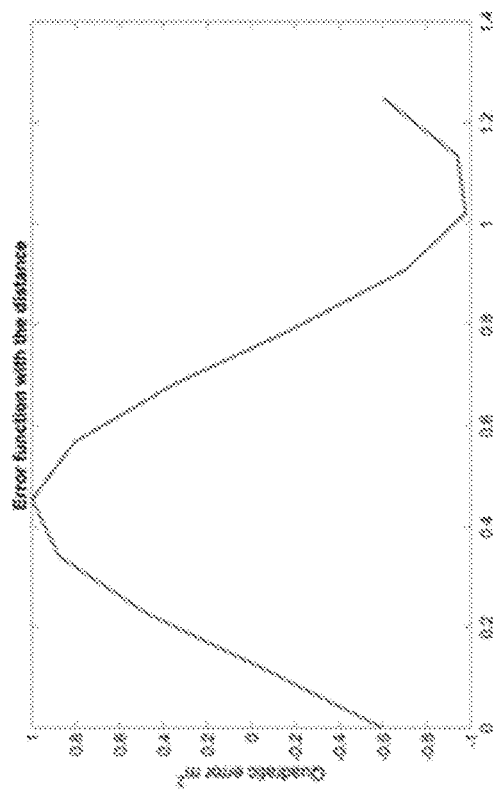

As illustrated by example in FIGS. 10A-10C, which each show an example of an output of a comparison function for a different frequency k, there may be only one determined minimum or determined maximum for each frequency k within the non-wrapped distance $d_{nw}$.

These points may be replicated for a number of wraps ($N_k$) allowed by the unambiguity range for each k frequency. The number of wraps $N_k$ may be assessed as the frequency k divided by the greatest common divisor of the frequencies gcd($\{f_k\}$), as described below in equation 12:

$$N_k = \frac{f_k}{gcd(\{f_k\})} \quad \text{(Eq 12)}$$

Distances $D_k$ may be found as described below in equation 13:

$$D_k = d_k + n_k d_k^{nw} \text{ with } n_k \in \{0, 1, \ldots, N_k\} \quad \text{(Eq 13)}$$

The distances $D_k$ obtained for every frequency k within the unambiguity range are evaluated to find a determined minimum or a determined maximum amid the distances. In other examples, a simplification of these methods can be done by producing a determined minimization or a determined maximization of the quadratic error for every wrap of the lowest frequency and evaluating the determined minimum or the determined maximum distances.

In some examples, another potentially more efficient method may evaluate fewer points by starting unwrapping with the lowest frequency k and identifying a first set of intersection points between the measured complex signal and the modeled signal. This gives an approximate set of distances d within an unambiguity range $D_k$.

These distances are transformed onto the wraps of the other frequencies. For each of the other frequencies, another set of intersection points are identified within a threshold distance of the one or more first points:

$$n_k = \text{floor}\left(\frac{2D_K f_k}{c}\right) \text{with } k \in \{0, 1, .. K-1\} \quad \text{(Eq 14)}$$

Figure 11:
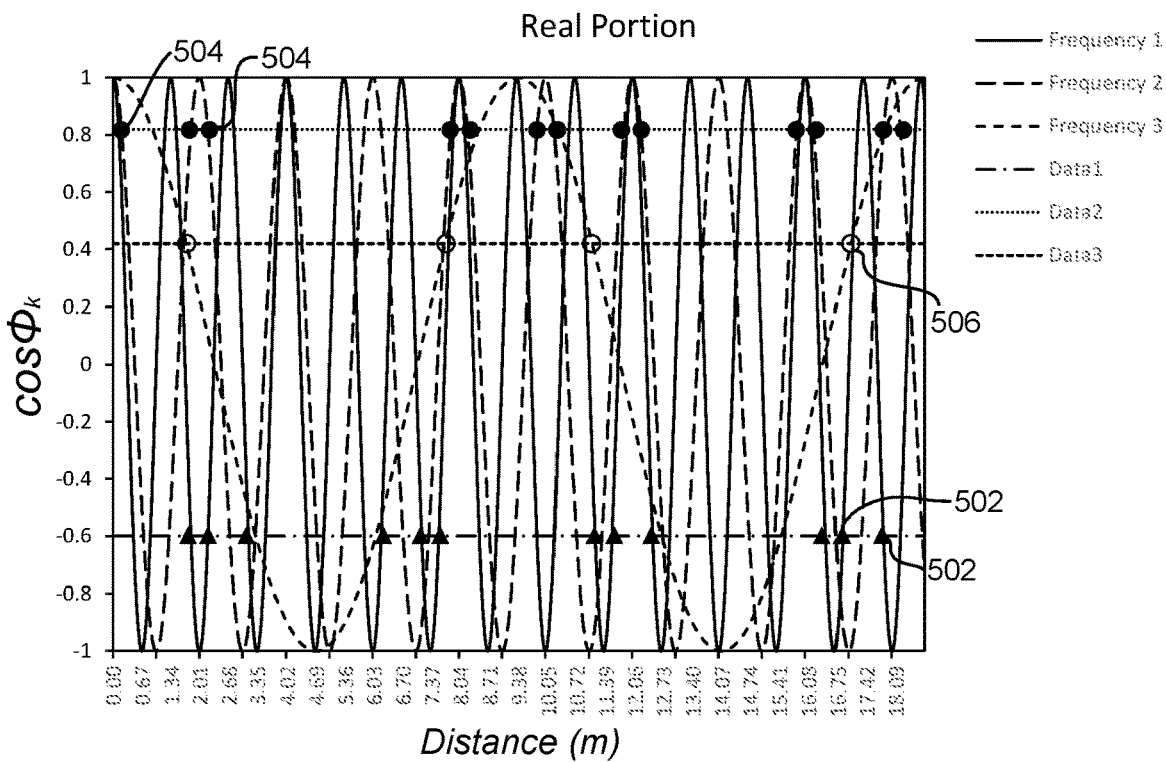
FIG. 11 shows a example of a plurality of points at which a real portion of a complex signal intersects a modeled real portion of a modeled signal.

FIG. 11 shows one example of a plurality of points at which a real portion of a complex signal intersects a modeled real portion of a modeled signal. As illustrated by example in FIG. 11, like in FIG. 5, "frequency 1" (cos $\phi_k$) and "data1" (cos $\tilde{\phi}_1$) intersect at points 502, "frequency 2" (cos $\phi_2$) and "data2" (cos $\tilde{\phi}_2$) intersect at points 504, and "frequency 3" (cos $\phi_3$) and "data3" (cos $\tilde{\phi}_3$) intersect at points 506.

As illustrated by example in FIG. 11, intersection points 506 are identified for every intersection of cos $\tilde{\phi}_k$ with cos $\phi_3$. For frequency 1 and frequency 2, intersection points 502 and intersection points 504 are determined that are one order above and one order below the intersection points 506. In this manner, intersection points for each frequency may be identified by searching a small number of wraps.

Distances obtained for every frequency within the unambiguity range are evaluated to find a determined minimum or a determined maximum amid the distances. In other examples, a simplification of these method can be done by producing a determined minimization or a determined maximization of the quadratic error for every wrap of the lowest frequency and evaluating the determined minimum or the determined maximum distances.

In some examples, a measured value of the complex signal falls between two discrete values of the modeled signal, and one of the discrete values may be chosen that results in a determined minimum or a determined maximum of the comparison function. In other examples, intersection points may be found by taking advantage of the slopes of the sine and cosine functions. The slopes between discrete points may be modeled using linear interpolation, polynomial interpolation, or any other suitable interpolation functions. The interpolation between points may reduce jitter by providing intermediate values where the measured signal would intersect the modeled signal between discrete points in a lookup table.

Figure 12:
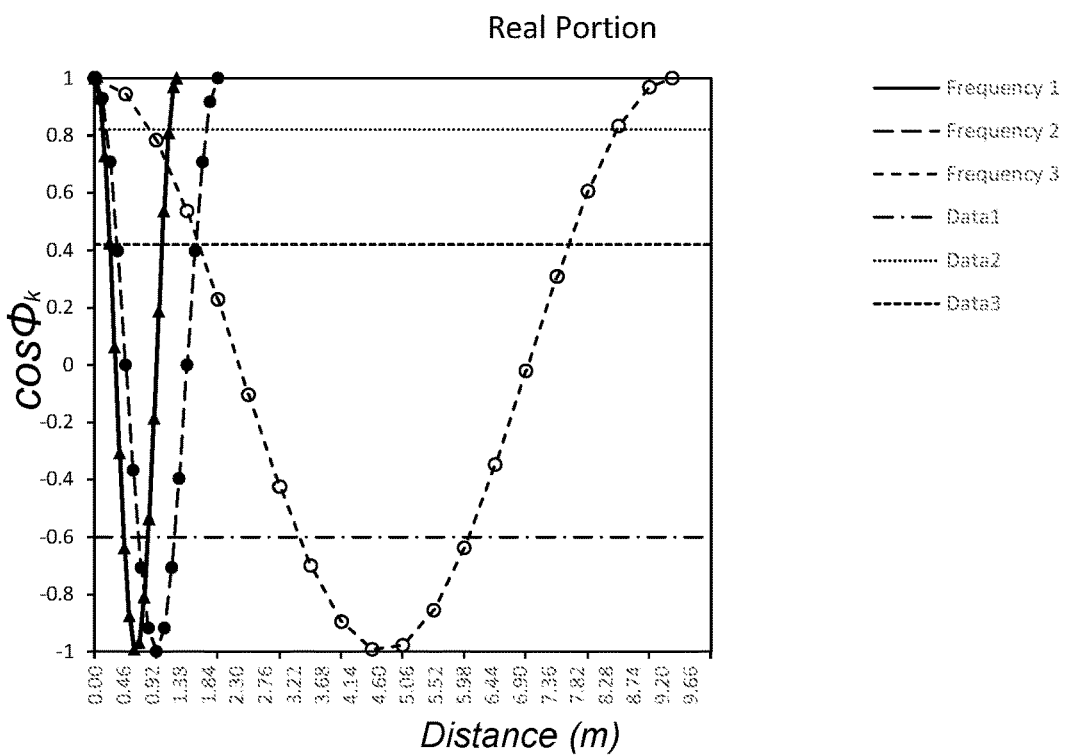
FIG. 12 shows an example of linear interpolations between discrete values of a modeled real portion of a modeled signal.

FIG. 12 shows an example of linear interpolations between discrete values of a modeled real portion of a modeled signal. The modeled real portion (cos $\phi_k$) is plotted for "frequency 1" (cos $\phi_1$), "frequency 2" (cos $\phi_2$), and "frequency 3" (cos $\phi_3$). FIG. 12 also shows three measured signal values: "data1" (cos $\tilde{\phi}_i$) which corresponds to "frequency 1", "data2" (cos $\tilde{\phi}_2$) which corresponds to "frequency 2", and "data3" (cos $\tilde{\phi}_3$) which corresponds to "frequency 3". In the example of FIG. 12, cos $\phi_1$ and cos $\tilde{\phi}_i$, cos $\phi_2$ and cos $\tilde{\phi}_2$, cos $\phi_3$ and cos $\tilde{\phi}_3$ intersect between discrete values of the modeled signal cos $\phi_k$.

Using linear interpolation, four total solutions may be produced for each wrap and frequency: two for the real portion (e.g. as illustrated in FIG. 12) and two for the corresponding imaginary portion. Combining them in pairs for the real portion and the imaginary portion, the point which is to be studied is the one that leads to a determined minimum or a determined maximum of the comparison function, as described above. Analogous procedures may be followed to determine a set of values that lead to the determined minimum or the determined maximum as described above.

Figure 13:
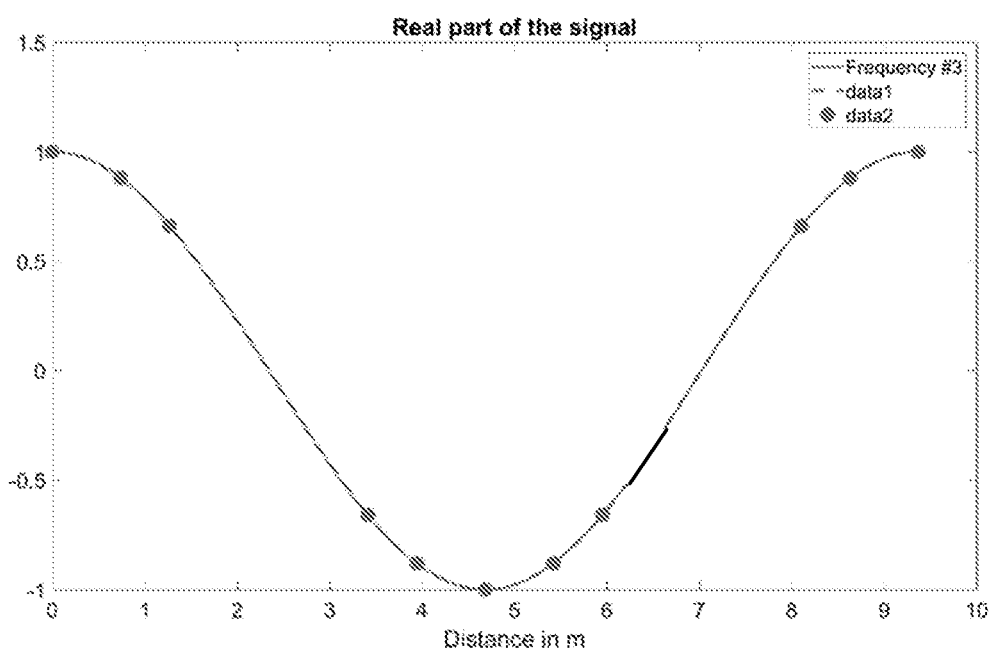
FIG. 13 shows an example of polynomial interpolations between discrete values of a modeled real portion of a modeled signal.

FIG. 13 illustrates an example in which polynomial interpolation is employed between discrete values of a modeled real portion of a modeled signal. In the example of FIG. 13, the modeled real portion of the signal is based on 11 discrete points, using a linear duty cycle of the sine and cosine (linear part) from (−0.66 to 0.66) and using 5 points to represent a curved part with at least a second degree polynomial. A degree of the polynomial may be a function of a signal level. The interpolated segments may be used in an analogous manner to the linear interpolation of FIG. 12.

Figure 14A:
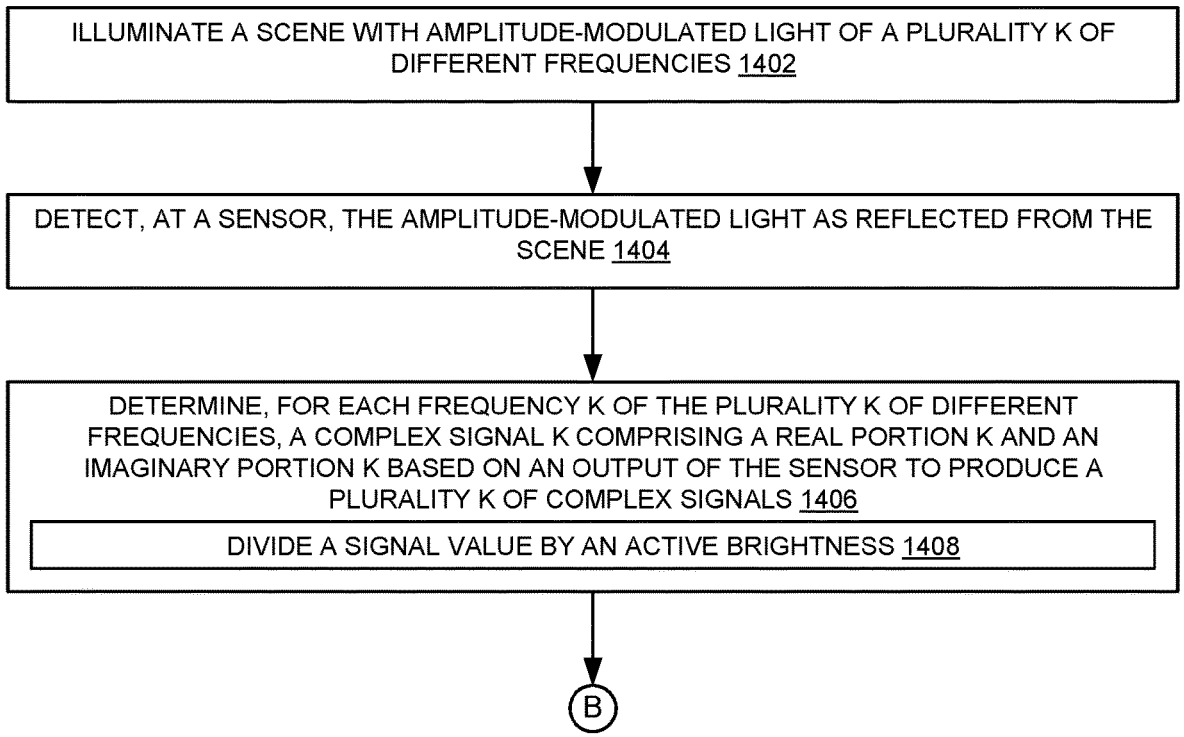
Figure 14C:
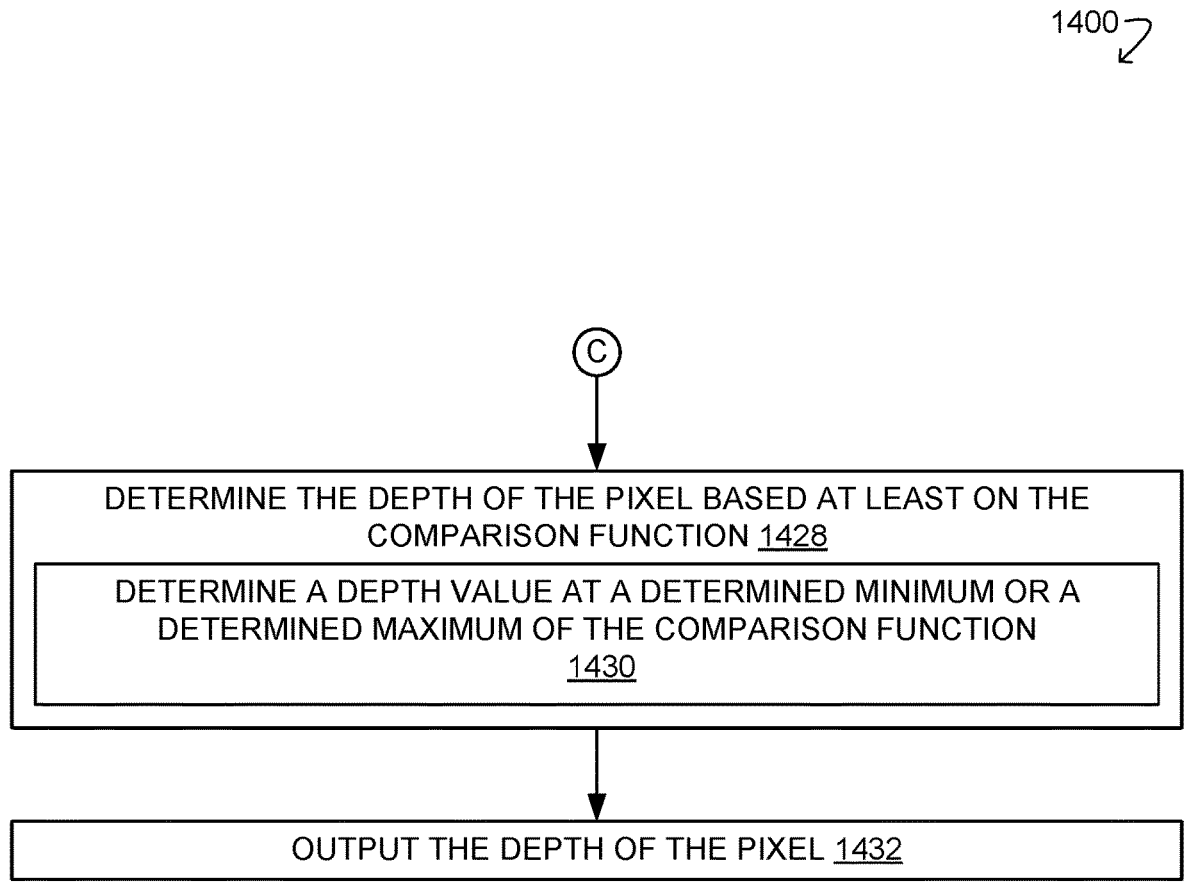

FIGS. 14A-14C illustrate a flow diagram depicting an example method 1400 for determining a depth of a pixel of a depth image. It will be appreciated that following description of method 1400 is provided by way of example and is not meant to be limiting. Therefore, it is to be understood that method 1400 may include additional and/or alternative steps relative to those illustrated in FIGS. 14A-14C. Further, it is to be understood that method 1400 may be performed in any suitable order. Further still, it is to be understood that one or more steps may be omitted from method 1400 without departing from the scope of this disclosure. It will also be appreciated that method 1400 also may be performed in other contexts using other suitable components.

With reference to FIG. 14A, at 1402, the method 1400 includes illuminating a scene with amplitude-modulated light of a plurality K of different frequencies. At 1404, the method 1400 includes detecting, at a sensor, the amplitude-modulated light as reflected from the scene. At 1406, the method 1400 includes determining, for each frequency k of the plurality K of different frequencies, a complex signal k comprising a real portion k and an imaginary portion k based on an output of the sensor to produce a plurality K of complex signals. In some examples, at 1408, determining the complex signal k includes dividing a signal value by an active brightness.

With reference to FIG. 14B, at 1410, the method 1400 includes using a comparison function to compare the plurality K of complex signals to a corresponding plurality K of modeled signals k, each modeled signal k comprising a modeled real portion k and a modeled imaginary portion k. The complex signals and the modeled signals may be compared in various ways. In some examples, at 1412, the method 1400 may include using the comparison function to compare the plurality K of complex signals to the plurality K of modeled signals by, for each frequency k, squaring a real difference between the real portion k and the modeled real portion k; for each frequency k, squaring a complex difference between the imaginary portion k and the modeled imaginary portion k; adding the real difference and the complex difference to form a difference of the sums for each frequency k; and summing the difference of the sums for all frequencies k. In such examples, the depth of the pixel corresponds to a distance of a determined minimum of the comparison function. At 1414, the modeled real portion k may comprise a cosine function and the modeled imaginary portion k may comprise a sine function.

In other examples, at 1416, the method 1400 may include using the comparison function to compare the complex signal to the modeled signal by, for each frequency k, determining a real product of the real portion k and the modeled real portion k; for each frequency k, determining a complex product of the imaginary portion k and the modeled imaginary portion k; adding the real product and the complex product to form a sum of the products for each frequency k; and summing the sum of the products for all frequencies k. In such examples, the depth of the pixel corresponds to a distance of a determined maximum of the comparison function.

In further examples, the method 1400 may include, at 1418, referencing a lookup table comprising discrete values of the modeled signal. In some such examples, at 1420, each modeled signal k may comprise a plurality of discrete points with a linear or polynomial interpolation between each pair of discrete points. In other examples, at 1422, the method 1400 may include, when a value of the complex signal k falls between two discrete values of the modeled signal k, choosing one of the discrete values based at least on the comparison function.

Further, in some examples, at 1424, the method 1400 may include, for at least one frequency k, identifying two points at which the complex signal k intersects the modeled signal k within a period of the modeled signal k; and generating any remaining intersection points for the frequency k within a range of ambiguity by adding the period of the modeled signal k to each of the two points. Additionally, in some examples, at 1426, the method 1400 may include, for a first frequency k, identifying one or more first points at which the complex signal k intersects the modeled signal k; and for a second frequency k, identifying one or more second points at which the complex signal k intersects the modeled signal k, wherein the one or more second points are within a threshold distance of the one or more first points.

At 1428, the method 1400 includes determining the depth of the pixel based at least on the comparison function. As described above, the depth of the pixel may be determined in various ways. For example, at 1430, determining the depth of the pixel may include determining a depth value at a determined minimum or a determined maximum of the comparison function. At 1432, the method 1400 includes outputting the depth of the pixel.

Figure 15:
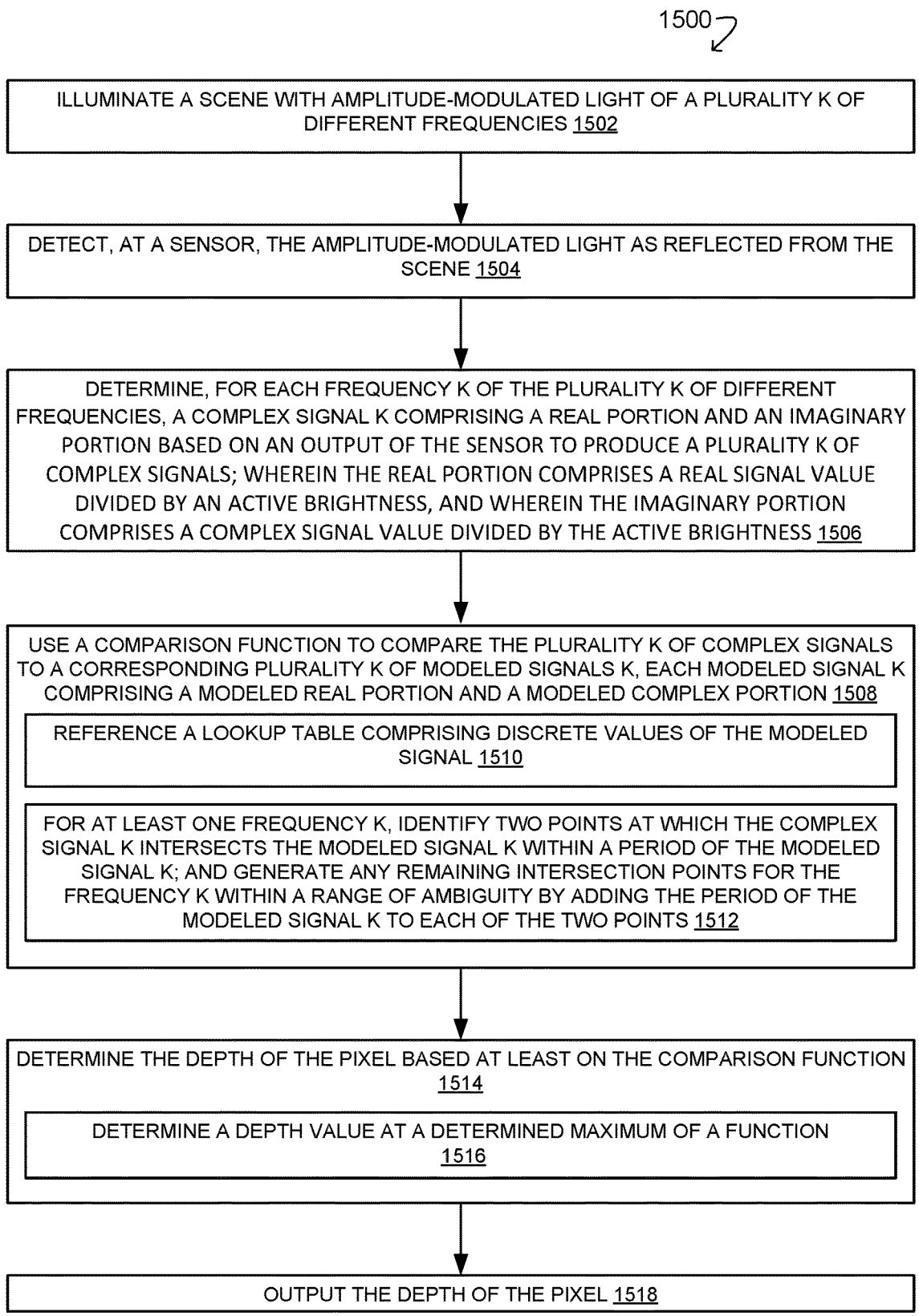
FIG. 15 shows a block diagram of another example method for determining a depth of a pixel in a depth image.

FIG. 15 illustrates a flow diagram depicting another example method 1500 for determining a depth of a pixel of a depth image. It will be appreciated that following description of method 1500 is provided by way of example and is not meant to be limiting. Therefore, it is to be understood that method 1500 may include additional and/or alternative steps relative to those illustrated in FIG. 15. Further, it is to be understood that method 1500 may be performed in any suitable order. Further still, it is to be understood that one or more steps may be omitted from method 1500 without departing from the scope of this disclosure. It will also be appreciated that method 1500 also may be performed in other contexts using other suitable components.

With reference to FIG. 15, at 1502, the method 1500 includes illuminating a scene with amplitude-modulated light of a plurality K of different frequencies. At 1504, the method 1500 includes detecting, at a sensor, the amplitude-modulated light as reflected from the scene. At 1506, the method 1500 includes determining, for each frequency k of the plurality of different frequencies K, a complex signal k comprising a real portion $\cos \tilde{\phi}_k$ and an imaginary portion $\sin \tilde{\phi}_k$ based on an output of the sensor to produce a plurality K of complex signals; wherein the real portion $\cos \tilde{\phi}_k$ comprises a real signal value $\tilde{S}_k^r$ divided by an active brightness $\widetilde{AB}_k$; wherein the imaginary portion $\sin \tilde{\phi}_k$ comprises a complex signal value $\tilde{S}_k^i$ divided by the active brightness $\widetilde{AB}_k$, and wherein the active brightness $\widetilde{AB}_k = \sqrt{(\tilde{S}_k^r)^2 + (\tilde{S}_k^i)^2}$.

At 1508, the method 1500 includes using a comparison function to compare the plurality K of complex signals to a corresponding plurality K of modeled signals, each modeled signal k comprising a modeled real portion $\cos \phi_k$ and a modeled imaginary portion $\sin \phi_k$. In some examples, at 1510, using the comparison function to compare the complex signal k to the modeled signal k includes referencing a lookup table comprising discrete values of the modeled signal k. At 1512, the method 1500 may include, for at least one frequency k, identifying two points at which the complex signal k intersects the modeled signal k within a period of the modeled signal k; and generating any remaining intersection points for the frequency k within a range of ambiguity by adding the period of the modeled signal k to each of the two points.

At 1514, the method 1500 includes determining the depth of the pixel based at least on the comparison function. As described above, the depth may be determined in various manners. For example, at 1516, the method 1500 may include determining the depth of the pixel by determining a depth value at a determined maximum of a function comprising $\Sigma_k^K \cos \phi_k * \cos \tilde{\phi}_k + \sin \phi_k * \sin \tilde{\phi}_k$. At 1518, the method 1500 includes outputting the depth of the pixel.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
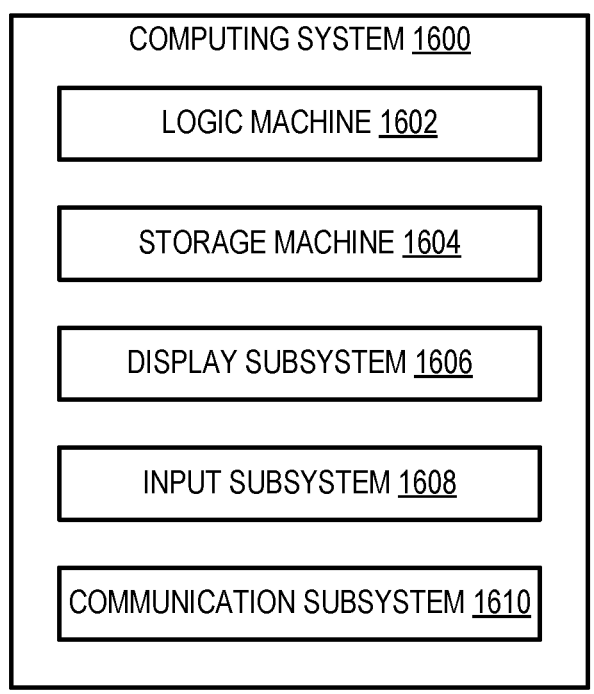
FIG. 16 shows a block diagram of an example computing system.

FIG. 16 schematically shows a non-limiting embodiment of a computing system 1600 that can enact one or more of the methods and processes described above. Computing system 1600 is shown in simplified form. Computing system 1600 may take the form of one or more personal computers, server computers, tablet computers, home-entertainment computers, network computing devices, gaming devices, mobile computing devices, mobile communication devices (e.g., smart phone), and/or other computing devices. For example, the electronic devices 100A-D and the depth sensing system 200 may comprise aspects of the computing system 1600

Computing system 1600 includes a logic machine 1602 and a storage machine 1604. Computing system 1600 may optionally include a display subsystem 1606, input subsystem 1608, communication subsystem 1610, and/or other components not shown in FIG. 16.

Logic machine 1602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1604 includes one or more physical devices configured to hold instructions executable by the logic machine to implement the methods and processes described herein. When such methods and processes are implemented, the state of storage machine 1604 may be transformed—e.g., to hold different data.

Storage machine 1604 may include removable and/or built-in devices. Storage machine 1604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1604 may include volatile, nonvolatile, dynamic, static, read/write, read-only, random-access, sequential-access, location-addressable, file-addressable, and/or content-addressable devices.

It will be appreciated that storage machine 1604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1602 and storage machine 1604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "engine" may be used to describe an aspect of computing system 1600 implemented to perform a particular function. In some cases, a program or engine may be instantiated via logic machine 1602 executing instructions held by storage machine 1604. It will be understood that different programs and/or engines may be instantiated from the same application, service, code block, object, library, routine, API, function, etc. Likewise, the same program and/or engine may be instantiated by different applications, services, code blocks, objects, routines, APIs, functions, etc. The terms "program" and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1606 may be used to present a visual representation of data held by storage machine 1604. This visual representation may take the form of a graphical user interface (GUI). As the herein described methods and processes change the data held by the storage machine, and thus transform the state of the storage machine, the state of display subsystem 1606 may likewise be transformed to visually represent changes in the underlying data. Display subsystem 1606 may include one or more display devices utilizing virtually any type of technology. Such display devices may be combined with logic machine 1602 and/or storage machine 1604 in a shared enclosure, or such display devices may be peripheral display devices.

When included, input subsystem 1608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1610 may be configured to communicatively couple computing system 1600 with one or more other computing devices. Communication subsystem 1610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1600 to send and/or receive messages to and/or from other devices via a network such as the Internet.

Another example provides, enacted on a depth-sensing system, a method for determining a depth of a pixel of a depth image, the method comprising: illuminating a scene with amplitude-modulated light of a plurality K of different frequencies; detecting, at a sensor, the amplitude-modulated light as reflected from the scene; determining, for each frequency k of the plurality K of different frequencies, a complex signal k comprising a real portion k and an imaginary portion k based on an output of the sensor to produce a plurality K of complex signals; using a comparison function to compare the plurality K of complex signals to a corresponding plurality K of modeled signals k, each modeled signal k comprising a modeled real portion k and a modeled imaginary portion k; determining the depth of the pixel based at least on the comparison function; and outputting the depth of the pixel. Determining the complex signal k may additionally or alternatively include dividing a signal value by an active brightness. Using the comparison function to compare the plurality K of complex signals to the plurality K of modeled signals may additionally or alternatively include: for each frequency k, squaring a real difference between the real portion k and the modeled real portion k; for each frequency k, squaring a complex difference between the imaginary portion k and the modeled imaginary portion k; adding the real difference and the complex difference to form a difference of the sums for each frequency k; and summing the difference of the sums for all frequencies k, wherein the depth of the pixel corresponds to a distance of a determined minimum of the comparison function. The modeled real portion k may additionally or alternatively include a cosine function and the modeled imaginary portion k may additionally or alternatively include a sine function. Using the comparison function to compare the complex signal to the modeled signal may additionally or alternatively include: for each frequency k, determining a real product of the real portion k and the modeled real portion k; for each frequency k, determining a complex product of the imaginary portion k and the modeled imaginary portion k; adding the real product and the complex product to form a sum of the products for each frequency k; and summing the sum of the products for all frequencies k, wherein the depth of the pixel corresponds to a distance of a determined maximum of the comparison function. Determining the depth of the pixel may additionally or alternatively include determining a depth value at a determined minimum or a determined maximum of the comparison function. Using the comparison function to compare the complex signal k to the modeled signal k may additionally or alternatively include referencing a lookup table comprising discrete values of the modeled signal. Each modeled signal k may additionally or alternatively include a plurality of discrete points with a linear or polynomial interpolation between each pair of discrete points. The method may additionally or alternatively include, when a value of the complex signal k falls between two discrete values of the modeled signal k, choosing one of the discrete values based at least on the comparison function. The method may additionally or alternatively include, for at least one frequency k, identifying two points at which the complex signal k intersects the modeled signal k within a period of the modeled signal k; and generating any remaining intersection points for the frequency k within a range of ambiguity by adding the period of the modeled signal k to each of the two points. The method may additionally or alternatively include, for a first frequency k, identifying one or more first points at which the complex signal k intersects the modeled signal k; and for a second frequency k, identifying one or more second points at which the complex signal k intersects the modeled signal k, wherein the one or more second points are within a threshold distance of the one or more first points.

Another example provides a depth sensing system, comprising: a light emitter configured to illuminate a scene with amplitude-modulated light of a plurality K of different frequencies; a sensor configured to detect the amplitude-modulated light as reflected from the scene; and a controller configured to determine, for each frequency k of the plurality of different frequencies K, a complex signal k comprising a real portion k and an imaginary portion k based on an output of the sensor to produce a plurality K of complex signals; use a comparison function to compare the plurality K of complex signals k to a corresponding plurality K of modeled signals k, each modeled signal k comprising a modeled real portion k and a modeled imaginary portion k; determine a depth of a pixel of a depth image based at least on the comparison function; and output the depth of the pixel. The controller may be additionally or alternatively configured to: for each frequency k, determine a real product of the real portion k and the modeled real portion k; for each frequency k, determine a complex product of the imaginary portion k and the modeled imaginary portion k; add the real product and the complex product to form a sum of the products for each frequency k; and sum the sum of the products for all frequencies k, wherein the depth of the pixel corresponds to a distance of a determined maximum of the comparison function. The controller may be additionally or alternatively configured to reference a lookup table comprising discrete values of the modeled signal. The controller may be additionally or alternatively configured to, when a value of the complex signal k falls between two discrete values of the modeled signal k, choose one of the discrete values based at least on the comparison function. The controller may be additionally or alternatively configured to: for at least one frequency k, identify two points at which the complex signal k intersects the modeled signal k within a period of the modeled signal k; and generate any remaining intersection points for the frequency k within a range of ambiguity by adding the period of the modeled signal k to each of the two points.

Another example provides, enacted on a depth-sensing system, a method for determining a depth of a pixel of a depth image, the method comprising: illuminating a scene with amplitude-modulated light of a plurality K of different frequencies; illuminating a scene with amplitude-modulated light of a plurality K of different frequencies; detecting, at a sensor, the amplitude-modulated light as reflected from the scene; determining, for each frequency k of the plurality of different frequencies K, a complex signal k comprising a real portion $\cos \phi_k$ and an imaginary portion $\sin \tilde{\phi}_k$ based on an output of the sensor to produce a plurality K of complex signals; wherein the real portion $\cos \tilde{\phi}_k$ comprises a real signal value $\tilde{S}_k^r$ divided by an active brightness $\widetilde{AB}_k$, wherein the imaginary portion $\sin \tilde{\phi}_k$ comprises a complex signal value $\tilde{S}_k^i$ divided by the active brightness $\widetilde{AB}_k$, and wherein the active brightness $\widetilde{AB}_k = \sqrt{(\tilde{S}_k^r)^2 + (\tilde{S}_k^i)^2}$; using a comparison function to compare the plurality K of complex signals to a corresponding plurality K of modeled signals, each modeled signal k comprising a modeled real portion $\cos \phi_k$ and a modeled imaginary portion $\sin \phi_k$; determining the depth of the pixel based at least on the comparison function; and outputting the depth of the pixel. Determining the depth of the pixel may additionally or alternatively include determining a depth value at a determined maximum of a function comprising $\Sigma_k^K \cos \phi_k * \cos \tilde{\phi}_k + \sin \phi_k * \sin \tilde{\phi}_k$. Using the comparison function to compare the complex signal k to the modeled signal k may additionally or alternatively include referencing a lookup table comprising discrete values of the modeled signal. The method may additionally or alternatively include: for at least one frequency k, identifying two points at which the complex signal k intersects the modeled signal k within a period of the modeled signal k; and generating any remaining intersection points for the frequency k within a range of ambiguity by adding the period of the modeled signal k to each of the two points.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted on a depth-sensing system, a method for determining a depth of a pixel of a depth image, the method comprising:
   illuminating a scene with amplitude-modulated light of a plurality K of different frequencies;
   detecting, at a sensor, the amplitude-modulated light as reflected from the scene;
   determining, for each frequency k of the plurality K of different frequencies, a complex signal k comprising a real portion k and an imaginary portion k based on an output of the sensor to produce a plurality K of complex signals;
   using a comparison function to compare the plurality K of complex signals to a corresponding plurality K of modeled signals k that comprise a noiseless model of the amplitude-modulated light, each modeled signal k comprising a modeled real portion k and a modeled imaginary portion k;
   determining the depth of the pixel based at least on the comparison function; and
   outputting the depth of the pixel.

2. The method of claim 1, wherein determining the complex signal k includes dividing a signal value by an active brightness.

3. The method of claim 1, wherein using the comparison function to compare the plurality K of complex signals to the plurality K of modeled signals comprises:
   for each frequency k, squaring a real difference between the real portion k and the modeled real portion k;
   for each frequency k, squaring a complex difference between the imaginary portion k and the modeled imaginary portion k;
   adding the real difference and the complex difference to form a difference of the sums for each frequency k; and
   summing the difference of the sums for all frequencies k, wherein the depth of the pixel corresponds to a distance of a determined minimum of the comparison function.

4. The method of claim 3, wherein the modeled real portion k comprises a cosine function and the modeled imaginary portion k comprises a sine function.

5. The method of claim 1, wherein using the comparison function to compare the complex signal to the modeled signal comprises:
for each frequency k, determining a real product of the real portion k and the modeled real portion k;
for each frequency k, determining a complex product of the imaginary portion k and the modeled imaginary portion k;
adding the real product and the complex product to form a sum of the products for each frequency k; and
summing the sum of the products for all frequencies k, wherein the depth of the pixel corresponds to a distance of a determined maximum of the comparison function.

6. The method of claim 1, wherein determining the depth of the pixel comprises determining a depth value at a determined minimum or a determined maximum of the comparison function.

7. The method of claim 1, wherein using the comparison function to compare the complex signal k to the modeled signal k comprises referencing a lookup table comprising discrete values of the modeled signal.

8. The method of claim 7, wherein each modeled signal k comprises a plurality of discrete points with a linear or polynomial interpolation between each pair of discrete points.

9. The method of claim 7, further comprising:
when a value of the complex signal k falls between two discrete values of the modeled signal k, choosing one of the discrete values based at least on the comparison function.

10. The method of claim 1, further comprising:
for at least one frequency k, identifying two points at which the complex signal k intersects the modeled signal k within a period of the modeled signal k; and
generating any remaining intersection points for the frequency k within a range of ambiguity by adding the period of the modeled signal k to each of the two points.

11. The method of claim 1, further comprising:
for a first frequency k, identifying one or more first points at which the complex signal k intersects the modeled signal k; and
for a second frequency k, identifying one or more second points at which the complex signal k intersects the modeled signal k, wherein the one or more second points are within a threshold distance of the one or more first points.

12. A depth sensing system, comprising:
a light emitter configured to illuminate a scene with amplitude-modulated light of a plurality K of different frequencies;
a sensor configured to detect the amplitude-modulated light as reflected from the scene; and
a controller configured to
determine, for each frequency k of the plurality of different frequencies K, a complex signal k comprising a real portion k and an imaginary portion k based on an output of the sensor to produce a plurality K of complex signals;
use a comparison function to compare the plurality K of complex signals k to a corresponding plurality K of modeled signals k that comprise a noiseless model of the amplitude-modulated light, each modeled signal k comprising a modeled real portion k and a modeled imaginary portion k;
determine a depth of a pixel of a depth image based at least on the comparison function; and
output the depth of the pixel.

13. The depth sensing system of claim 12, wherein the controller is further configured to:
for each frequency k, determine a real product of the real portion k and the modeled real portion k;
for each frequency k, determine a complex product of the imaginary portion k and the modeled imaginary portion k;
add the real product and the complex product to form a sum of the products for each frequency k; and
sum the sum of the products for all frequencies k, wherein the depth of the pixel corresponds to a distance of a determined maximum of the comparison function.

14. The depth sensing system of claim 12, wherein the controller is further configured to reference a lookup table comprising discrete values of the modeled signal.

15. The depth sensing system of claim 14, wherein the controller is further configured to, when a value of the complex signal k falls between two discrete values of the modeled signal k, choose one of the discrete values based at least on the comparison function.

16. The depth sensing system of claim 12, wherein the controller is further configured to:
for at least one frequency k, identify two points at which the complex signal k intersects the modeled signal k within a period of the modeled signal k; and
generate any remaining intersection points for the frequency k within a range of ambiguity by adding the period of the modeled signal k to each of the two points.

17. Enacted on a depth-sensing system, a method for determining a depth of a pixel of a depth image, the method comprising:
illuminating a scene with amplitude-modulated light of a plurality K of different frequencies;
detecting, at a sensor, the amplitude-modulated light as reflected from the scene;
determining, for each frequency k of the plurality of different frequencies K, a complex signal k comprising a real portion $\cos \tilde{\phi}_k$ and an imaginary portion $\sin \tilde{\phi}_k$ based on an output of the sensor to produce a plurality K of complex signals;
wherein the real portion $\cos \tilde{\phi}_k$ comprises a real signal value $\tilde{S}_k^r$ divided by an active brightness $\widetilde{AB}_k$,
wherein the imaginary portion $\sin \tilde{\phi}_k$ comprises a complex signal value $\tilde{S}_k^i$ divided by the active brightness $\widetilde{AB}_k$, and
wherein the active brightness $\widetilde{AB}_k = \sqrt{(\tilde{S}_k^r)^2 + (\tilde{S}_k^i)^2}$;
using a comparison function to compare the plurality K of complex signals to a corresponding plurality K of modeled signals that comprise a noiseless model of the amplitude-modulated light, each modeled signal k comprising a modeled real portion $\cos \phi_k$ and a modeled imaginary portion $\sin \phi_k$;
determining the depth of the pixel based at least on the comparison function; and
outputting the depth of the pixel.

18. The method of claim 17, wherein determining the depth of the pixel comprises determining a depth value at a determined maximum of a function comprising $\Sigma_k^K \cos \phi_k * \cos \tilde{\phi}_k + \sin \phi_k * \sin \tilde{\phi}_k$.

19. The method of claim 17, wherein using the comparison function to compare the complex signal k to the modeled signal k comprises referencing a lookup table comprising discrete values of the modeled signal.

20. The method of claim 17, further comprising:
for at least one frequency k, identifying two points at which the complex signal k intersects the modeled signal k within a period of the modeled signal k; and
generating any remaining intersection points for the frequency k within a range of ambiguity by adding the period of the modeled signal k to each of the two points.

\* \* \* \* \*